(12) United States Patent
Miyazono

(10) Patent No.: US 7,540,750 B2
(45) Date of Patent: Jun. 2, 2009

(54) ELECTRICAL CONNECTOR AND LIQUID CRYSTAL DISPLAY DEVICE

(75) Inventor: Katsunori Miyazono, Osaka (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 12/003,820

(22) Filed: Jan. 2, 2008

(65) Prior Publication Data

US 2008/0113540 A1    May 15, 2008

Related U.S. Application Data

(63) Continuation of application No. 11/500,923, filed on Aug. 9, 2006, now Pat. No. 7,344,397.

(30) Foreign Application Priority Data

Aug. 12, 2005    (JP) .............................. 2005-234794

(51) Int. Cl.
*H01R 33/02* (2006.01)
(52) U.S. Cl. .................................. 439/226
(58) Field of Classification Search .............. 439/226, 439/242; 349/58, 70; 362/225, 614; 315/291
See application file for complete search history.

(56) References Cited

U.S. PATENT DOCUMENTS

| | | | |
|---|---|---|---|
| 1,890,680 A * | 12/1932 | Harase ...................... | 439/242 |
| 2,441,456 A | 5/1948 | Thayer | |
| 2,729,799 A | 1/1956 | Pistey | |
| 3,851,295 A | 11/1974 | Geier | |
| 4,795,357 A | 1/1989 | Kosmol et al. | |
| 5,261,831 A * | 11/1993 | Vendal et al. ............... | 439/232 |
| 5,886,758 A * | 3/1999 | Ibaraki ....................... | 349/58 |
| 6,869,300 B2 | 3/2005 | Lefki et al. | |
| 7,255,470 B2 | 8/2007 | Lee et al. | |
| 7,265,500 B2 | 9/2007 | Ono et al. | |
| 2003/0112626 A1 | 6/2003 | Yoo et al. | |

(Continued)

FOREIGN PATENT DOCUMENTS

DE    3537 601 A1    4/1987

(Continued)

OTHER PUBLICATIONS

European Search Report, Ref. P026825EP PP, App No. 06254189. 1-2214, J.S.T.Mfg. Co., Ltd. Mar. 9, 2007 (4 pages).

(Continued)

*Primary Examiner*—Alexander Gilman
(74) *Attorney, Agent, or Firm*—Rader, Fishman & Grauer, PLLC

(57) ABSTRACT

An electrical connector has a contact held by a housing and an operating member for operating the contact. The housing includes an insertion recess into which a shaft-like terminal is inserted along a first direction. A pair of elastic pieces of the contact respectively include clamp portions for clipping the terminal in predetermined clamping directions orthogonal to the first direction. The first direction is along a radial direction of the terminal. The operating member includes a widening operating portion for widening the distance between the clamp portions of the pair of elastic pieces.

4 Claims, 15 Drawing Sheets

U.S. PATENT DOCUMENTS

2006/0279957 A1  12/2006  Kwon et al.

FOREIGN PATENT DOCUMENTS

| EP | 1 753 088 A3 | 2/2007 |
|---|---|---|
| JP | 58-164191 U | 11/1983 |
| JP | 62-14684 U | 1/1987 |
| JP | 2-77886 U | 6/1990 |
| JP | 08-008009 A | 1/1996 |
| JP | 10-289610 A | 10/1998 |
| JP | 2001-043715 A | 2/2001 |
| JP | 2001-076529 A | 3/2001 |
| JP | 2001-250605 A | 9/2001 |
| JP | 2002-367422 A | 12/2002 |
| JP | 2003-279984 A | 10/2003 |
| JP | 2004-259645 A | 9/2004 |
| JP | 2005-259370 A | 9/2005 |
| JP | 2006-244749 A | 9/2006 |
| JP | 2006-344602 A | 12/2006 |

OTHER PUBLICATIONS

JPO Notification (1 page) with English translation (1 page) issued to App. No. 2007-072782, Dispatch No. 175814, Dispatch Date: Nov. 20, 2007.

Information Office Form issued to App. No. 2007-072782, Transmission date: Oct. 10, 2007 (9 pages).

JPO Notification (1 page) with English translation (1 page) issued to App. No. 2007-072783, Dispatch No. 175822, Dispatch Date: Nov. 20, 2007.

Information Offer Form issued to App. No. 2007-072783, Transmission date: Oct. 10, 2007 (12 pages).

Japanese Office Action dated Oct. 2, 2007 issued for patent Application No. JP2007-072782.

JPO Decision of Refusal with English Translation, App. No. 2007-072782, Dispatch No. 136453, Dispatch Date: Mar. 11, 2008 (4 pages total).

Korean P.O. Decision to Grant a Patent, App. No. 10-2006-0076202, Jan. 22, 2009 (2 pages).

Korean P.O. Decision to Grant a Patent, App. No. 10-2007-0038041, Jan. 28, 2009 (2 pages).

* cited by examiner

ELECTRICAL CONNECTOR AND LIQUID CRYSTAL DISPLAY DEVICE

The present application is a continuation of patent application Ser. No. 11/500,923 filed, Aug. 9, 2006 claiming Japanese priority No. 2005-234794 filed Aug. 12, 2005, the entire contents of which are incorporated herein by reference.

BACKGROUND OF THE INVENTION

1. Field of the Invention

The present invention relates to an electrical connector which is connected to a fluorescent tube for a backlight of a liquid crystal display device, etc., and a liquid crystal display device including the same.

2. Description of Related Arts

For example, as a connecting structure of a terminal of a fluorescent tube such as a cold cathode fluorescent tube to be used as a backlight of a liquid crystal display type television or monitor, the following documents 1 and 2 have been proposed:

Document 1: Japanese Unexamined Patent Publication No. 2001-250605 (date of publication: Sep. 14, 2001)
Document 2: Japanese Unexamined Patent Publication No. 2004-259645 (date of publication: Sep. 16, 2004)

In the documents 1 and 2, a connection fitting fixed to one end of an electric wire is soldered to a terminal (electrode) of a cold cathode fluorescent tube. The other end of the electric wire is connected to an inverter circuit via a connector. Electric power from the inverter circuit is supplied to the cold cathode fluorescent tube via the connector and the electric wire.

However, in the documents 1 and 2, a continuity failure may occur between the terminal and the connection fitting due to defective soldering. In addition, the soldering is troublesome. In particular, the cold cathode fluorescent tube has a thin shape with a diameter of several millimeters, and the terminal is thinner than this, so that handling of these requires great care. Therefore, enormous labor is required for soldering.

Not only the case of using a cold cathode fluorescent tube but also cases of using other fluorescent tubes such as an external electrode fluorescent tube or using a shaft-like terminal other than the fluorescent tubes also have a similar problem.

An object of the present invention is to provide an electrical connector that realizes reliable and easy connection of a shaft-like terminal and a liquid crystal display device including the same.

SUMMARY OF THE INVENTION

According to a preferred mode of the present invention, an electrical connector includes an insulating housing, a contact held by the housing, and an operating member for operating the contact. The housing includes an insertion recess in which a shaft-like terminal is inserted in a predetermined inserting direction. The contact includes a pair of elastic pieces facing each other. At least a part of the pair of elastic pieces is exposed to the insertion recess. The pair of elastic pieces respectively have clamp portions for clamping the terminal in predetermined clamping directions substantially orthogonal to the predetermined inserting direction. The predetermined inserting direction is along a first diameter direction of the terminal, and the predetermined clamping directions are in a second diameter direction of the terminal. The operating member includes a widening operating portion for widening the distance between the clamp portions of the pair of elastic pieces.

According to this mode, while the distance between the clamp portions of the pair of elastic pieces of the contact are widened by the widening operating portion of the operating member, the terminal can be readily inserted between the clamp portions in their diameter directions. Next, by releasing the widening operation by the widening operating portion, the terminal is elastically clamped between the clamp portions. Thereby, a predetermined contact pressure is generated between the contact and the terminal, and as a result, electrical connection between the contact and the terminal can be reliably performed.

DETAILED DESCRIPTION OF THE PREFERRED EMBODIMENT

A preferred embodiment of the present invention will be described with reference to the accompanying drawings.

Figure 1:
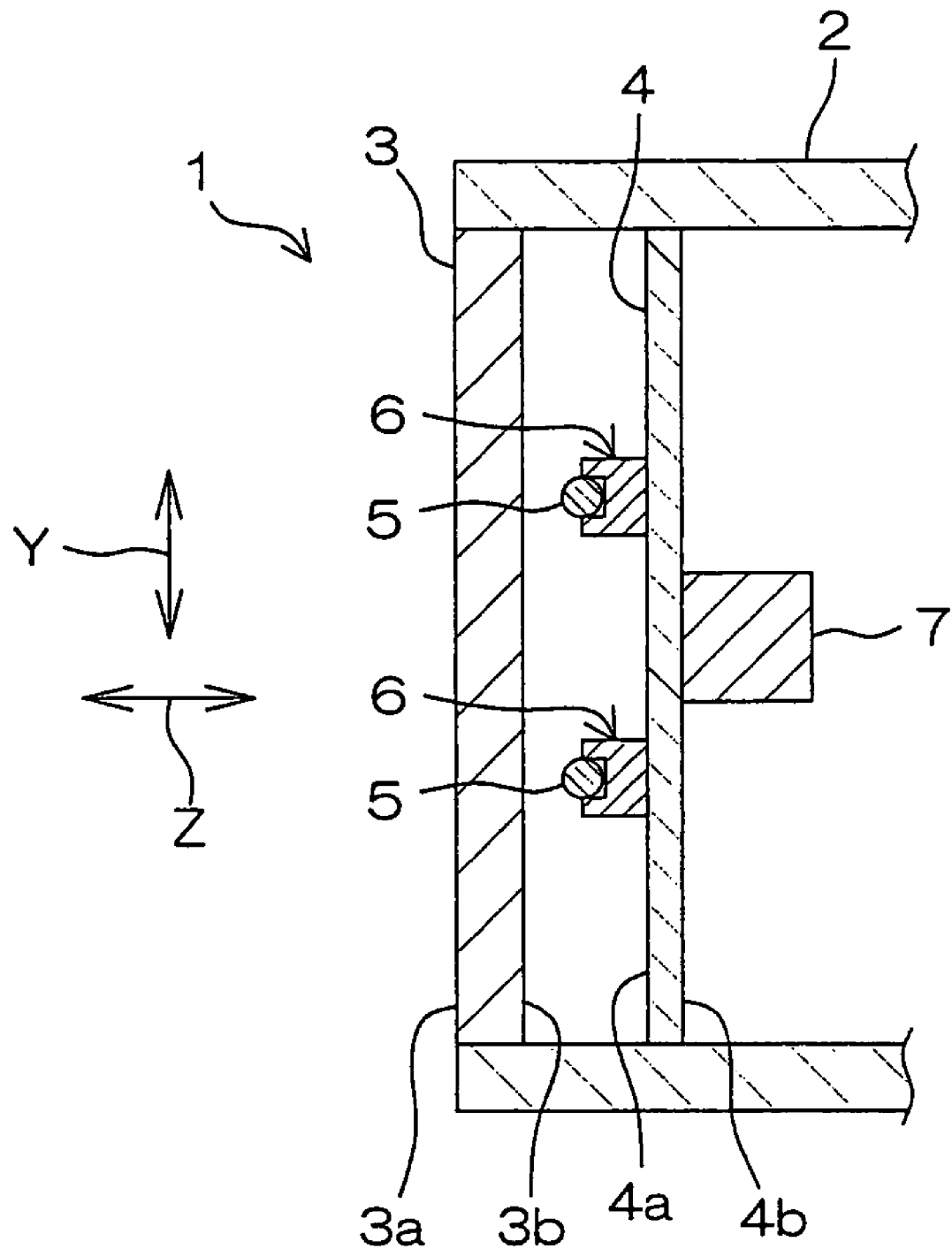
FIG. 1 is a schematic sectional view showing a general construction of a liquid crystal display device including an electrical connector according to an embodiment of the present invention.

FIG. 1 is a schematic sectional view showing a general construction of a liquid crystal display device including an electrical connector according to an embodiment of the present invention. Referring to FIG. 1, the liquid crystal display device 1 is used as, for example, a monitor of a television or a personal computer.

The liquid crystal display device 1 includes a casing 2, a liquid crystal panel 3, a circuit board 4 disposed in the rear of the liquid crystal panel 3, a plurality of cold cathode fluorescent tubes 5 as fluorescent tubes, electrical connectors 6 (hereinafter, simply referred to as connectors), and an inverter circuit 7.

The liquid crystal panel 3 is a non light-emitting display panel, and is attached to an opening on the front of the casing 2. The front face 3a of the liquid crystal panel 3 faces forward of the casing 2, and the back face 3b thereof faces rearward of the casing 2.

The circuit board 4 is a plate-shaped member disposed parallel to the liquid crystal panel 3 and fixed to the casing 2, and includes a first surface 4a facing the back face 3b of the liquid crystal panel 3 and a second surface 4b on the opposite side of the first surface 4a.

The cold cathode fluorescent tubes 5 serve as a backlight of the liquid crystal panel 3, and are disposed between the back face 3b of the liquid crystal panel 3 and the first surface 4a of the circuit board 4. The number of cold cathode fluorescent tubes 5 is, for example, two per 1 inch of the liquid crystal panel 3.

Figure 2:
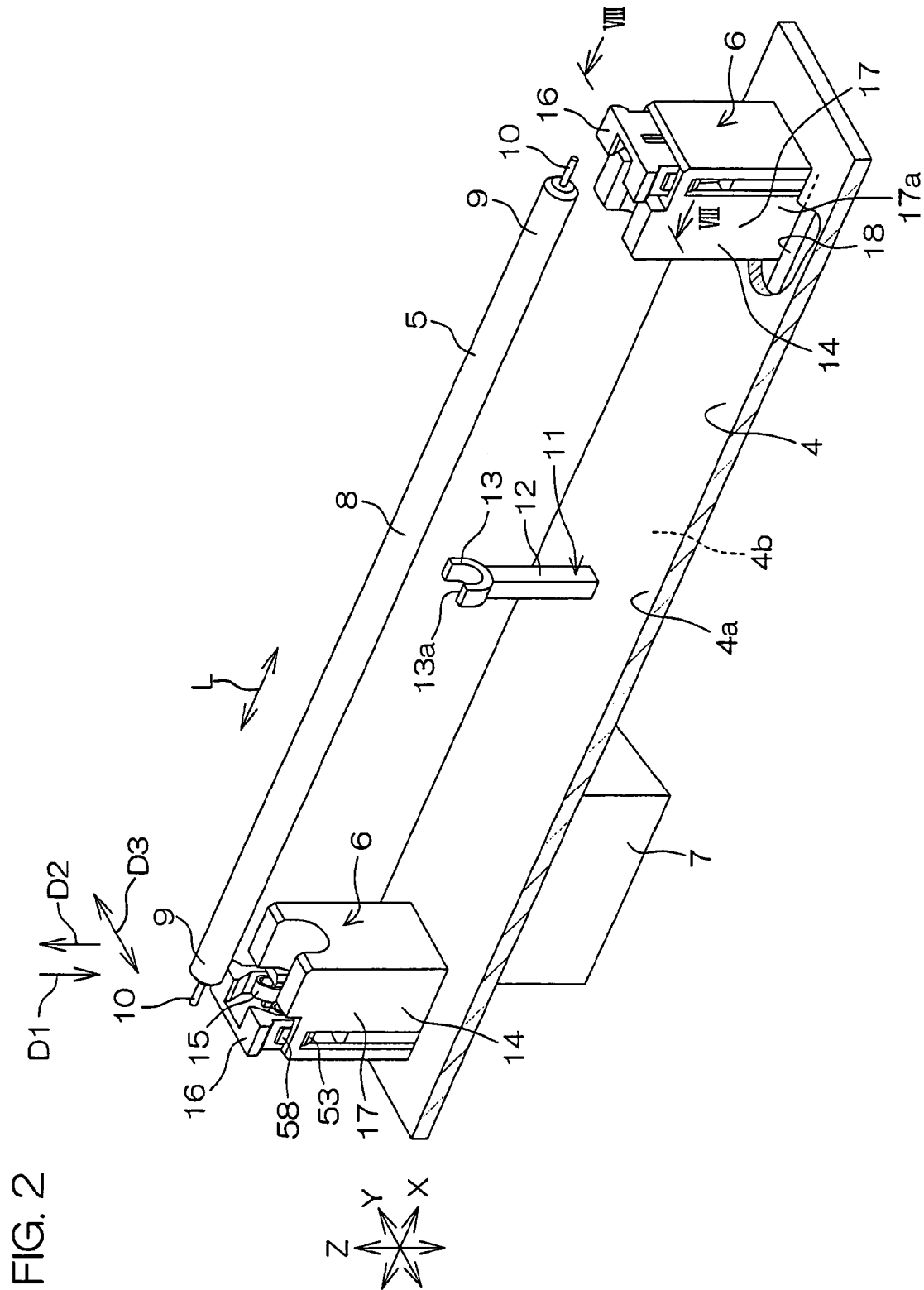
FIG. 2 is an exploded perspective view of a main part of FIG. 1.

As shown in FIG. 2, the longitudinal direction L of each cold cathode fluorescent tube 5 is along the direction X (corresponding to the left and right direction of the casing 2: the direction perpendicular to the sheet surface in FIG. 1). Referring to FIG. 1, the respective cold cathode fluorescent tubes 5 are disposed at predetermined intervals along the direction Y (corresponding to the vertical direction of the casing 2). The cold cathode fluorescent tubes 5 each are parallel to the back face 3b of the liquid crystal panel 3. The respective cold cathode fluorescent tubes 5 and the liquid crystal panel 3 are spaced at a predetermined distance in the direction Z (corresponding to the lateral direction of the casing 2). Each cold cathode fluorescent tube 5 irradiates the liquid crystal panel 3 with light from the rear side.

The electrical connector 6 is for realizing electrical connection between the cold cathode fluorescent tubes 5 and the circuit board 4 (and eventually the inverter circuit 7). This connector 6 is attached to each of the pair of ends of each cold cathode fluorescent tube 5 between the back face 3b of the liquid crystal panel 3 and the first surface 4a of the circuit board 4.

The inverter circuit 7 performs a function to supply driving power to the cold cathode fluorescent tubes 5, and is attached to the second surface 4b of the circuit board 4. The inverter circuit 7 and the respective cold cathode fluorescent tubes 5 are electrically connected to each other via the circuit board 4 and corresponding connectors 6.

Figure 3:
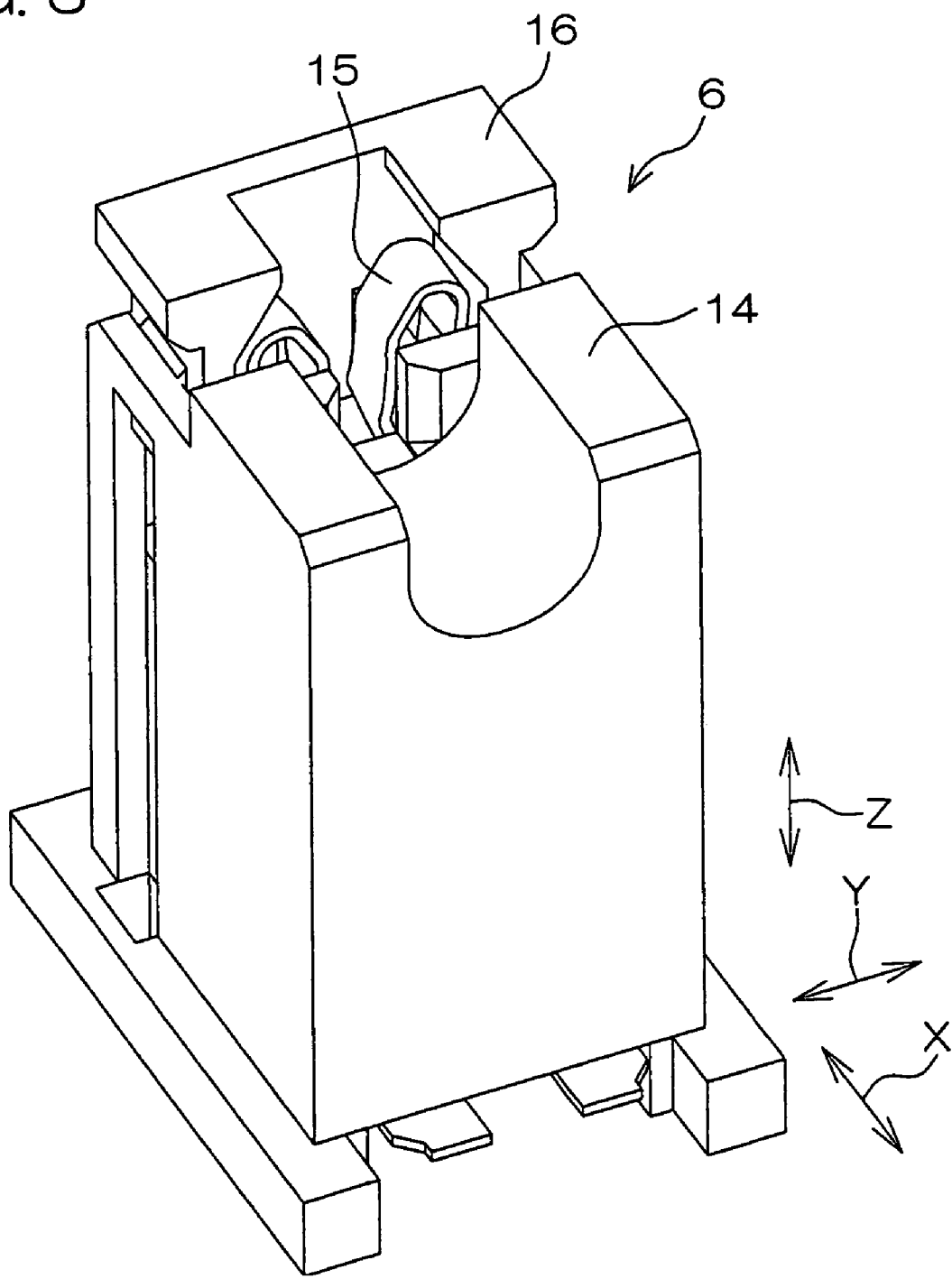
FIG. 3 is a perspective view of an electrical connector.

FIG. 2 is an exploded perspective view of a main part of FIG. 1. FIG. 3 is a perspective view of the connector 6.

The attaching structures of the respective cold cathode fluorescent tubes 5 are the same, so the attaching structure of one cold cathode fluorescent tube 5 will be mainly described below.

Referring to FIG. 2, the cold cathode fluorescent tube 5 includes a cylindrical main body 8 extending straight along the direction X, and outer leads 10 and 10 (electrodes) as a pair of terminals provided on a pair of end portions 9 and 9 of the main body 8, respectively. The outer leads 10 as terminals project along the longitudinal direction L from the corresponding end portions 9 of the main body 8.

The main body 8 is a member made of, for example, glass with a diameter of several millimeters through several tens of millimeters. The pair of outer leads 10 are metal-made shaft-like conductive members made of soft iron, etc., and are exposed in the direction X from the respective corresponding end portions 9. These outer leads 10 have a diameter of, for example, approximately 1 millimeter and a length of several millimeters.

A clamping member 11 is provided for holding the cold cathode fluorescent tube 5 and supporting the weight of the cold cathode fluorescent tube 5. One or a plurality (one in this embodiment) of clamping members 11 are provided for each cold cathode fluorescent tube 5. The number of clamping members 11 is properly determined according to the length of the cold cathode fluorescent tube 5. The clamping member 11 is arranged at a middle portion of the main body 8 of the cold cathode fluorescent tube 5.

This clamping member 11 is, for example, a synthetic resin molded item, and includes a support column 12 and an arced holder 13. The support column 12 is fixed to the first surface 4a of the circuit board 4 and extends in the direction Z. The holder 13 holds the middle portion of the main body 8 of the cold cathode fluorescent tube 5 while restraining radial (in the directions Y and Z in FIG. 2) movements of the cold cathode fluorescent tube 5.

This holder 13 is in an arced shape that can surround a part slightly longer than a peripheral half of the main body 8 of the cold cathode fluorescent tube 5. In a part in the peripheral direction of the holder 13, an opening 13a into which the main body 8 of the cold cathode fluorescent tube 5 is inserted is formed.

Into the opening 13a, the middle portion in the longitudinal direction L of the main body 8 of the cold cathode fluorescent tube 5 is inserted and held along a first direction D1 that is an attaching direction of the cold cathode fluorescent tube 5 to the connectors 6. The opening 13a is open to a second direction D2 (corresponding to a removing direction of the cold cathode fluorescent tube 5 from the connectors 6) opposite the first direction D1.

As described above, the connector 6 is provided on the pair of end portions 9 and 9, respectively, of the main body 8 of the cold cathode fluorescent tube 5. The constructions of the connectors 6 are the same, so that one connector 6 will be mainly described below.

Referring to FIG. 3, the connector 6 has lengths of 10 through 15 millimeters in the directions X, Y, and Z, respectively, and includes a housing 14, a contact 15 held by this housing 14, and an operating member 16 for operating this contact 15.

Figure 4:
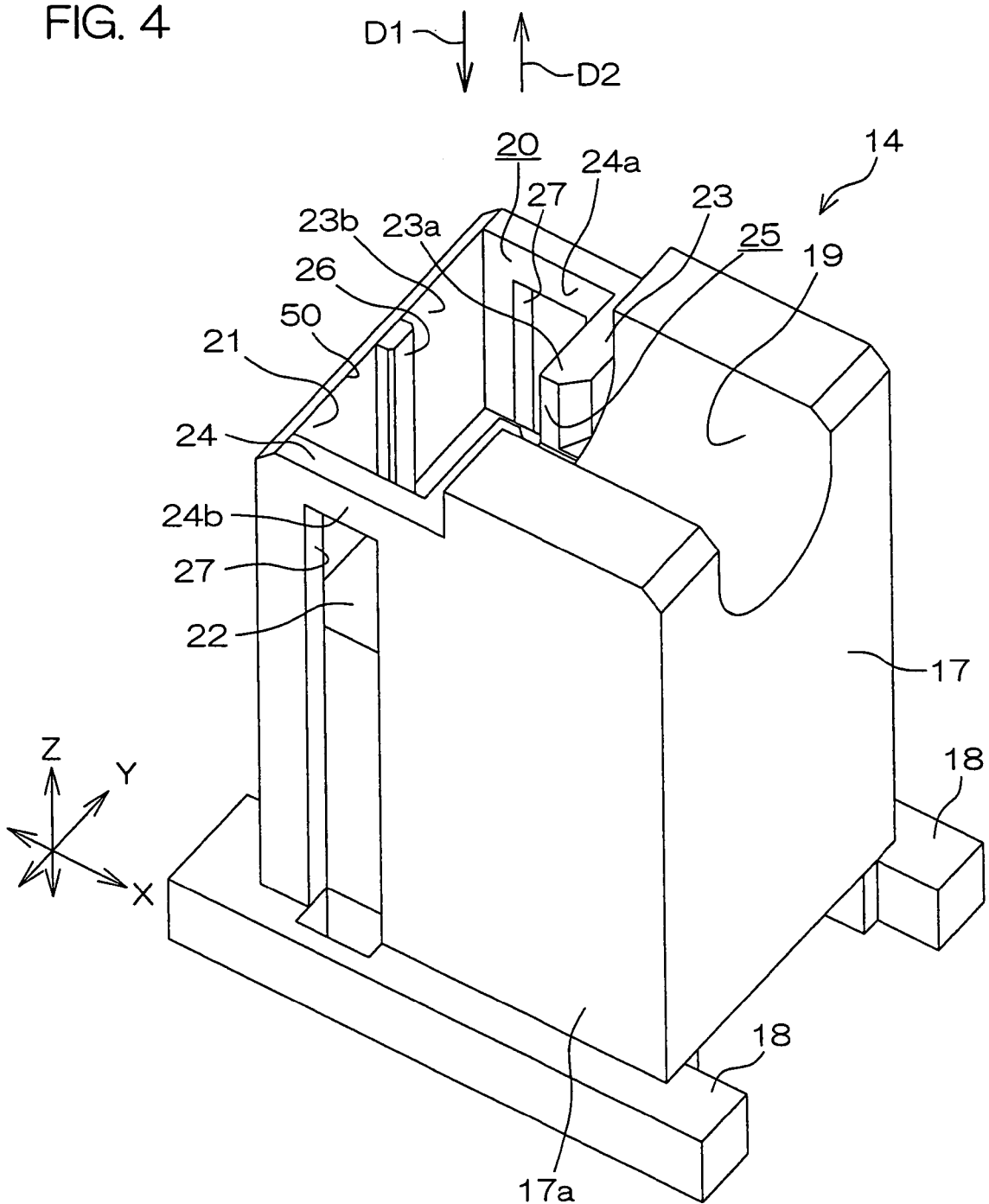
FIG. 4 is a perspective view of a housing for the electrical connector.

FIG. 4 is a perspective view of the housing 14. Referring to FIG. 2 and FIG. 4, the housing 14 is an integrally molded item made of a synthetic resin, and has a main body 17 and seating portions 18 extended from the main body 17.

The main body 17 is generally shaped into a box. In the circuit board 4, a through hole is formed at a place where the connector 6 is disposed, and through this through hole, the main body 17 projects from the first surface 4a to the back face 3b (see FIG. 1) of the liquid crystal panel 3.

Referring to FIG. 2 and FIG. 4 again, at an end portion of the main body 17 in the second direction D2, an introducing groove 19 having a U-shaped or a groove-shaped section is formed. Into the introducing groove 19, a corresponding end portion 9 of the cold cathode fluorescent tube 5 is introduced. The end portion 9 of the cold cathode fluorescent tube 5 introduced into the introducing groove 19 is protected by being surrounded by the inner surface of the introducing groove 19.

At the end portion in the second direction D2 of the main body 17, an insertion recess 20 is provided. Into the insertion recess 20, an outer lead 10 as a terminal of the cold cathode fluorescent tube 5 is inserted in the first direction D1 as the attaching direction.

The insertion recess 20 is demarcated by a peripheral wall 21 and a bottom wall 22 and has a rectangular section, and functions as a receiving cavity for receiving the outer lead 10. The peripheral wall 21 includes a pair of first side portions 23a and 23b facing each other in the direction X and a pair of second side portions 24a and 24b facing each other in the direction Y.

One first side portion 23a is adjacent to the introducing groove 19, and divides between the introducing groove 19 and the insertion recess 20. In the first side portion 23a, at the center in the direction Y, a notched groove 25 is provided. Through the notched groove 25, a corresponding outer lead 10 can be inserted.

Although not shown, the bottom of the notched groove 25 functions as a stopper to prevent the outer lead 10 from being shifted although this is not shown. That is, when the outer lead 10 tilts at a predetermined angle with respect to the housing 14, the outer lead 10 is received by the bottom of the notched groove 25 so as not to tilt more.

The phrase "the outer lead 10 tilts with respect to the housing 14" means at least one of a state that the entirety (the main body 8 and the outer lead 10) of the cold cathode fluorescent tube 5 tilts with respect to the housing 14 (circuit board 4) and a state that the main body 8 of the cold cathode fluorescent tube 5 does not tilt with respect to the housing 14 (parallel to the circuit board 4) and the outer lead 10 tilts with respect to the main body 8.

The other first side portion 23b is provided with a guide portion 26 for guiding the operating member 16 along the first and second directions D1 and D2 (direction Z). This guide portion 26 is of a convex shape disposed on the inner side surface of the other first side portion 23b, and extends in the direction Z.

In the pair of second side portions 24a and 24b, through holes 27 are respectively formed. The respective through holes 27 extend along the direction Z. Into the through holes 27, first and second convex portions 53 and 58 described later of the operating member 16 are inserted.

The seating portions 18 are a pair of flange portions provided on the end portion 17a of the main body 17 in the first direction D1. The seating portions 18 are respectively disposed on the pair of end portions of the main portion 17 in the direction Y and longitudinally extend in the direction X. The respective seating portions 18 are in contact with and received by the second surface 4b of the circuit board 4. Thereby, the position of the housing 14 in the direction Z with respect to the circuit board 4 is determined.

Figure 5:
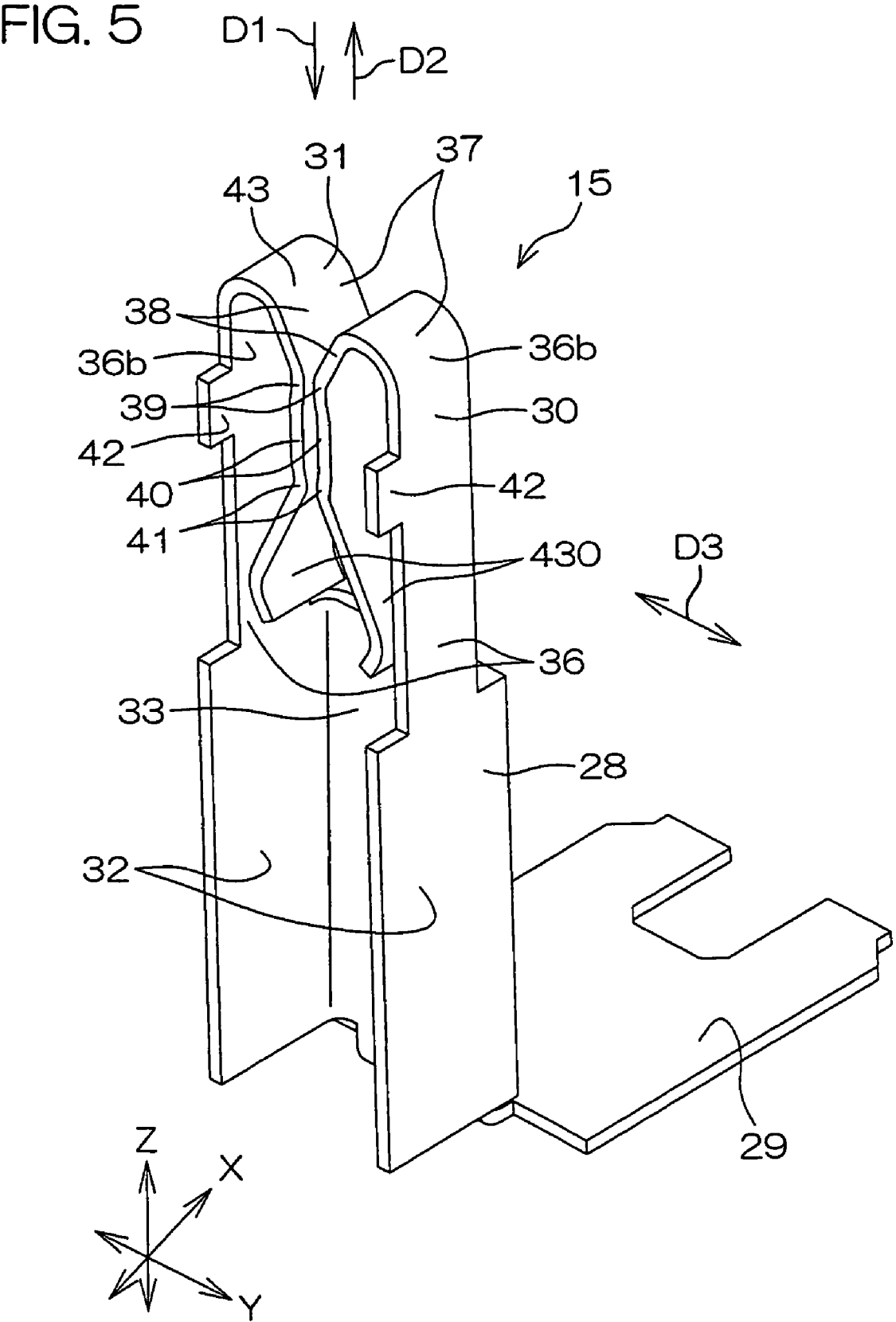
FIG. 5 is a perspective view of a contact.
Figure 6:
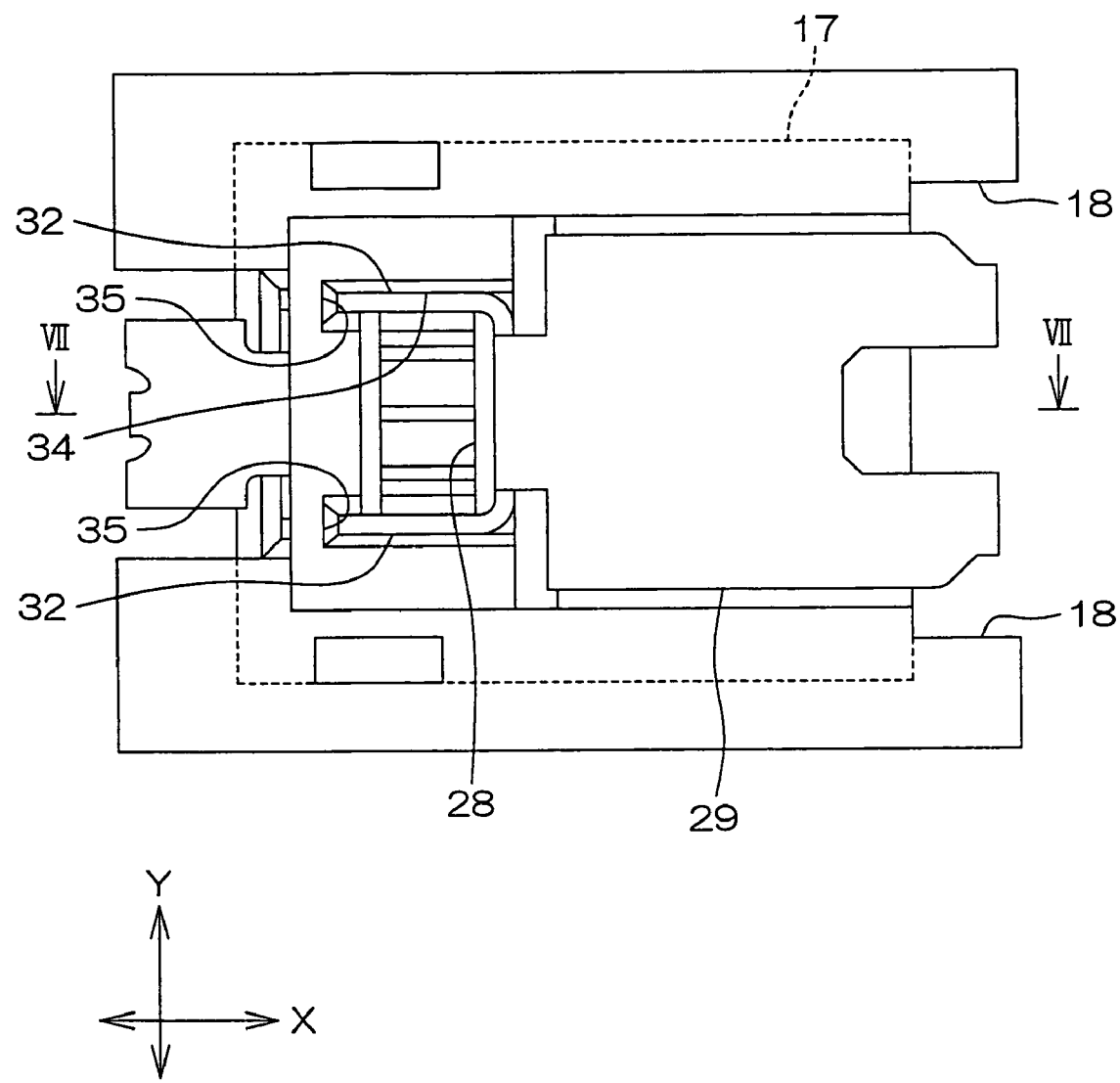
FIG. 6 is a plan view of the contact observed along a second direction.
Figure 7:
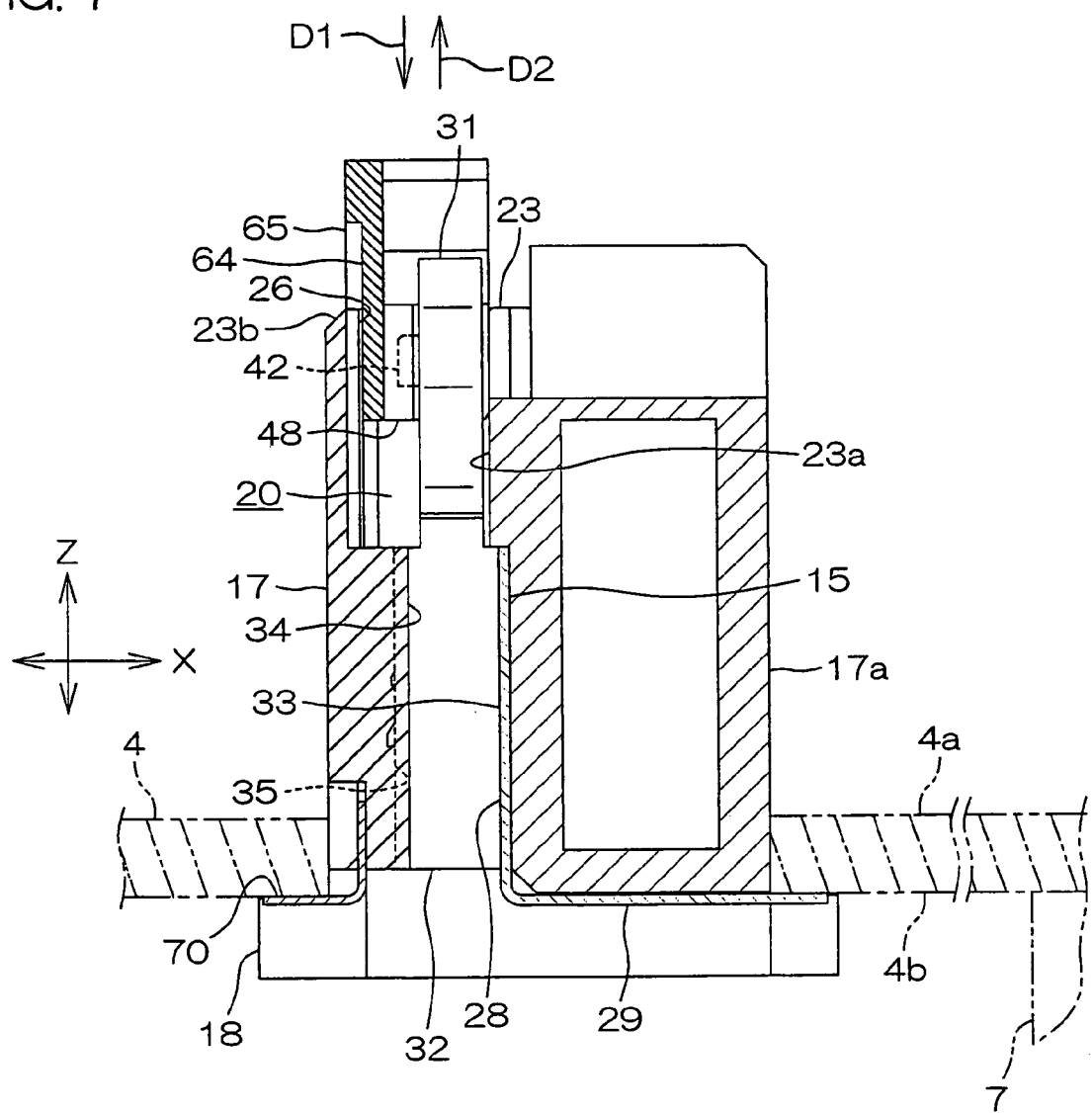
FIG. 7 is a sectional view along the VII-VII line of FIG. 6.
Figure 8:
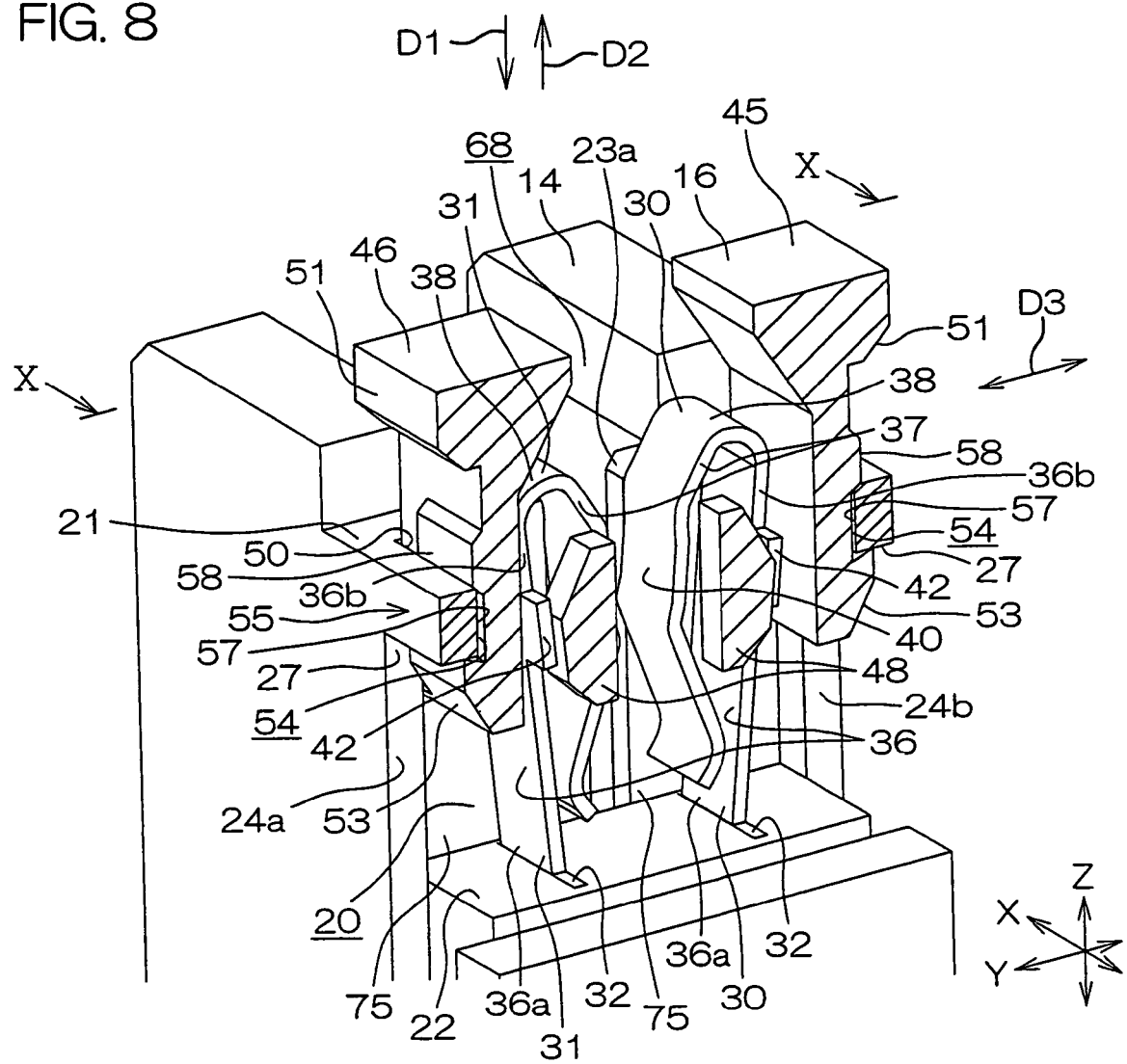
FIG. 8 is a sectional view of the main part along the VIII-VIII line of FIG. 2, illustrating a state that the contact is widened.
Figure 9:
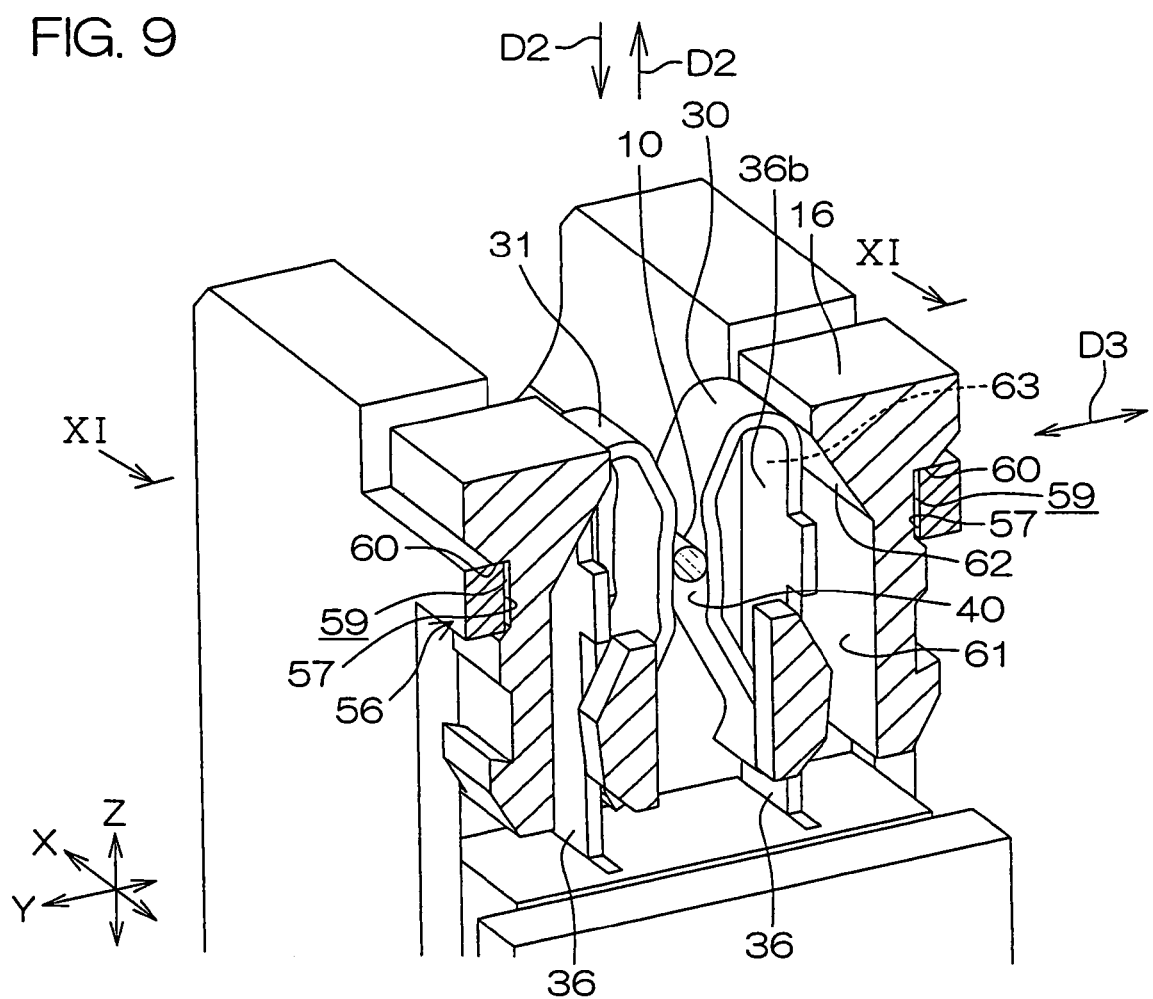
FIG. 9 is a sectional view of the main part along the VIII-VIII line of FIG. 2, illustrating a state that the widening of the contact is released.
Figure 10:
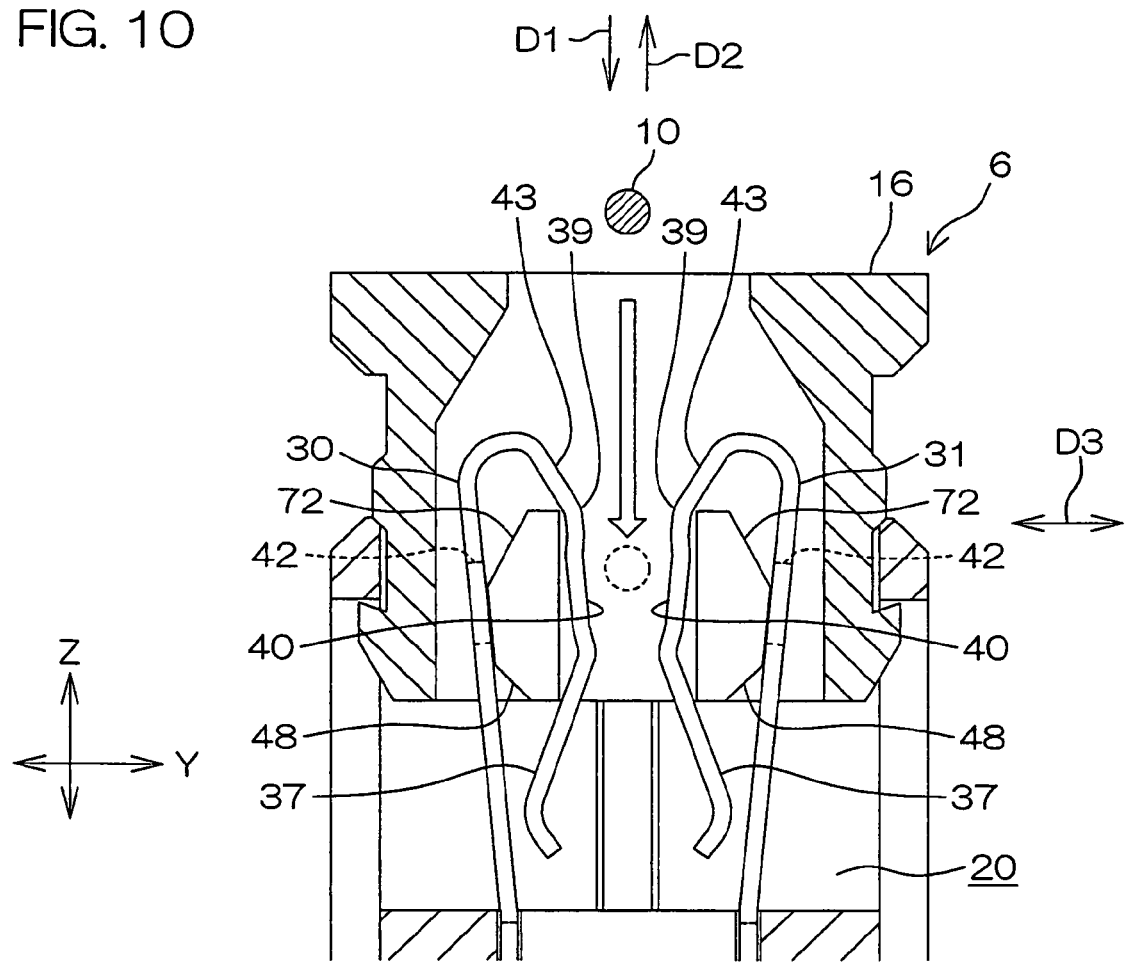
FIG. 10 is a sectional view along the X-X line of FIG. 8.
Figure 11:
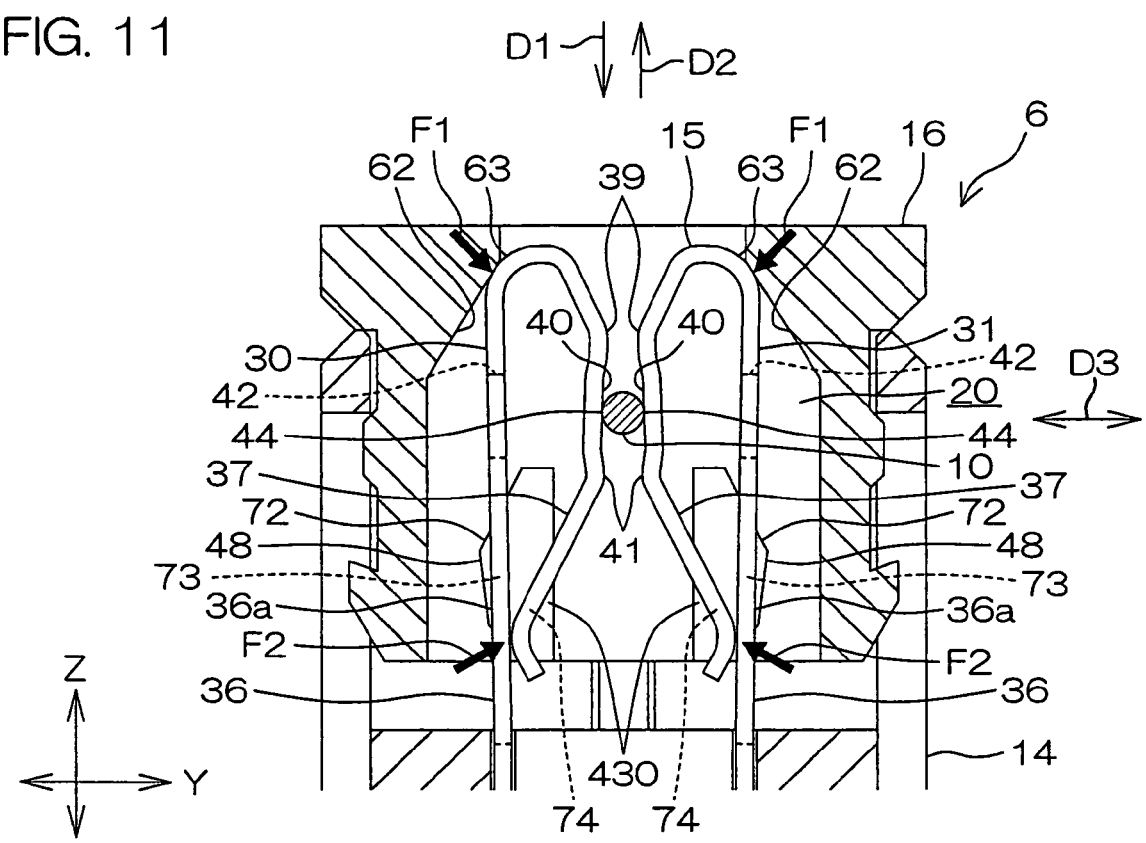
FIG. 11 is a sectional view along the XI-XI line of FIG. 9.

FIG. 5 is a perspective view of the contact 15. FIG. 6 is a plan view of the connector 6 observed along the second direction D2. FIG. 7 is a sectional view along the VII-VII line of FIG. 6. FIG. 8 is a sectional view of the main part along the VIII-VIII line of FIG. 2, showing a state that the contact 15 is widened. FIG. 9 is a sectional view of the main part along the VIII-VIII line of FIG. 2, showing a state that the widening of the contact 15 is released. FIG. 10 is a sectional view along the X-X line of FIG. 8. FIG. 11 is a sectional view along the XI-XI line of FIG. 9.

Referring to FIG. 2 and FIG. 5, the contact 15 is a conductive member made of a metal, etc. In detail, the contact 15 is a sheet metal member. The contact 15 makes electrical connection to the outer lead 10 of the cold cathode fluorescent tube 5. By the contact 15, electrical connection between the outer lead 10 and the circuit board 4 is realized.

The contact 15 is symmetrical to the direction Y, and has a main body 28, a lead 29, and a pair of elastic pieces 30 and 31 facing each other.

The main body 28 longitudinally extends in the direction Z, and has a U-shaped section orthogonal to the direction Z. The U shaped paired portions facing each other are formed into flange portions 32. In the main body 28, the section sandwiched by the flange portions 32 is defined as an intermediate portion 33.

Referring to FIG. 6 and FIG. 7, the main body 28 is press-fitted in and fixed to an insertion hole 34 formed in the main body 17 of the housing 14. The insertion hole 34 extends in the direction Z to the insertion recess 20 from the end portion 17a in the second direction D2 of the main body 17 of the housing 14. The peripheral surface of the insertion hole 34 surrounds the main body 28 of the contact 15.

On the peripheral surface of the insertion hole 34, a pair of engaging grooves 35 and 35 that engage with the pair of flange portions 32 are respectively formed. The engaging grooves 35 extend in the direction Z, and along the engaging grooves 35, the main body 28 of the contact 15 can be inserted.

The main body 28 of the contact 15 is received by one end portion of one first side portion 23a of the peripheral wall 21, and the position thereof in the direction Z with respect to the housing 14 is determined. It is allowed that the main body 28 of the contact 15 is not received by the one first side portion 23a of the peripheral wall 21 of the housing 14. In this case, according to the insertion amount of the main body 28 into the insertion hole 34, the position of the contact 15 in the direction Z is determined.

Referring to FIG. 5 and FIG. 7, the lead 29 comes into contact with the second surface 4b of the circuit board 4 and realizes electrical connection between the circuit board 4 and the contact 15. This lead 29 is provided on one end portion of the main body 28 and extends to one side of the direction X from the main body 28. The lead 29 and the second surface 4b of the circuit board 4 are parallel to each other, and are in contact with each other. The lead 29 is soldered to the circuit board 4 and connected to the inverter circuit 7 via the circuit board 4. A metal-made reinforcing member 70 provided on the end portion 17a in the second direction D2 of the main body 17 of the housing 14 is fixed to the second surface 4b of the circuit board 4.

Referring to FIG. 2 and FIG. 8, a pair of elastic pieces 30 and 31 realize electrical connection to corresponding outer leads 10, respectively. The pair of elastic pieces 30 and 31 face each other in the direction Y. The pair of elastic pieces 30 and 31 are respectively disposed on the second direction D2 side with respect to the corresponding flange portions 32 and project to the insertion recess 20, and are almost entirely exposed to the insertion recess 20. It is also possible that only a part of the pair of elastic pieces 30 and 31 is exposed to the insertion recess 20.

Each of the pair of elastic pieces 30 and 31 includes a first piece 36 extending along the second direction D2 and a second piece 37 that is folded back from a tip end portion 36b of the corresponding first piece 36 and extends along the first direction D1. The pair of first pieces 36 are disposed relatively distant from each other in the direction Y, and the pair of second pieces 37 are disposed relatively close to each other.

Each first piece 36 extends along the second direction D2 from a tip end portion in the second direction D2 of the corresponding flange portion 32, and penetrates the bottom wall 22 of the insertion recess 20 of the housing 14. The pair of elastic pieces 30 and 31 can be made elastically close or separated from each other around fulcrums at base end portions 36a of the respective first pieces 36. In a free state (with no external force applied), the respective first pieces 36 are arranged parallel to each other. At a tip end portion 36b of the respective first pieces 36, an engaging portion 42 to engage with a widening operating portion 48 described later is provided. Each engaging portion 42 is formed by a small piece projecting to one side of the direction X from the tip end portion 36b of the corresponding first piece 36.

Referring to FIG. 2 and FIG. 5, each second piece 37 includes a folded back portion 38 continued to the tip end portion 36b of the corresponding first piece 36, a first narrowing portion 39, a straight clamp portion 40 for clipping the outer lead 10 in a predetermined clamping direction D3 (corresponding to a radial direction of the outer lead 10), a second narrowing portion 41, and a tip end portion 430. The clamp portion 40 extends straight along the first direction D1.

On one-side surfaces (outer side surfaces) of the pair of folded back portions 38, guide portions 43 for guiding the attaching of the outer lead 10 are respectively provided (only one guide portion 43 is shown in FIG. 5). The pair of guide portions 43 narrow their distance toward the first direction D1.

The pair of first narrowing portions 39 are for preventing the corresponding outer lead 10 from improperly coming off in the second direction D2 from the pair of clamp portions 40. The pair of first narrowing portions 39 are provided on the tip ends in the first direction D1 of the pair of folded back portions 38. In other words, they are provided on the opposite side of the pair of clamp portions 40 in the first direction D1.

The distance between the pair of first narrowing portions 39 is made narrower than the distance between the pair of guide portions 43, and made narrower than the distance between the pair of clamp portions 40. When the pair of elastic pieces 30 and 31 are made close to each other, the distance between the pair of first narrowing portions 39 becomes narrower than the diameter of the outer lead 10.

The pair of clamp portions 40 are for allowing relative movements of the corresponding outer lead 10 in the first and second directions D1 and D2 (direction Z) while realizing electrical connection between the corresponding outer lead 10 and the contact 15. The respective clamp portions 40 are provided on the first direction D1 side of the corresponding first narrowing portions 39. The respective clamp portions 40 extend along the direction Z (first direction D1) in a free state, and face parallely to each other.

Referring to FIG. 11, in each clamp portion 40, a portion in contact with the outer lead 10 forms a contact portion 44 between the back face 3b of the liquid crystal panel 3 and the first surface 4a (see FIG. 1) of the circuit board 4. A pair of contact portions 44 face each other in the direction Y, and elastically clip the outer lead 10 therebetween.

Referring to FIG. 2 and FIG. 5 again, the pair of second narrowing portions 41 are for preventing the corresponding outer lead 10 from improperly coming off from the pair of clamp portions 40 toward the first direction D1. The pair of second narrowing portions 41 are provided on the first direction D1 side of the pair of clamp portions 40.

The distance between the air of second narrowing portions 41 is set narrower than the distance between the pair of clamp portions 40. When the pair of elastic pieces 30 and 31 come close to each other, the distance between the pair of second narrowing portions 41 becomes narrower than the diameter of the outer lead 10.

The respective tip end portions 430 are provided on the first direction D1 side of the corresponding second narrowing portions 41. These tip end portions 430 are for narrowing the distance between the pair of clamp portions 40 by being pressed by the first pieces 36. Thereby, the force for clipping the outer lead 10 by the pair of clamp portions 40 can be increased. In addition, lowering in the clipping force due to settling of the pair of elastic pieces 30 and 31 can be prevented.

The pair of tip end portions 430 are in an inverted V shape when they are observed along the direction X, and the distance therebetween expands toward the first direction D1. On the tip ends in the first direction D1 of the respective tip end portions 430, bent portions that are bent in directions approaching each other are provided so as to smoothly engage with the corresponding first pieces 36.

Referring to FIG. 2 and FIG. 8, the operating member 16 is for performing operations of clipping and releasing the clipping of the outer lead 10 by the pair of clamp portions 40, and are relatively movably fitted in the insertion recess 20 of the housing 14 in the first and second directions D1 and D2. In FIG. 8, the operating member 16 at a widening position is illustrated, and in FIG. 9, the operating member 16 at a widening released position is illustrated.

Figure 12:
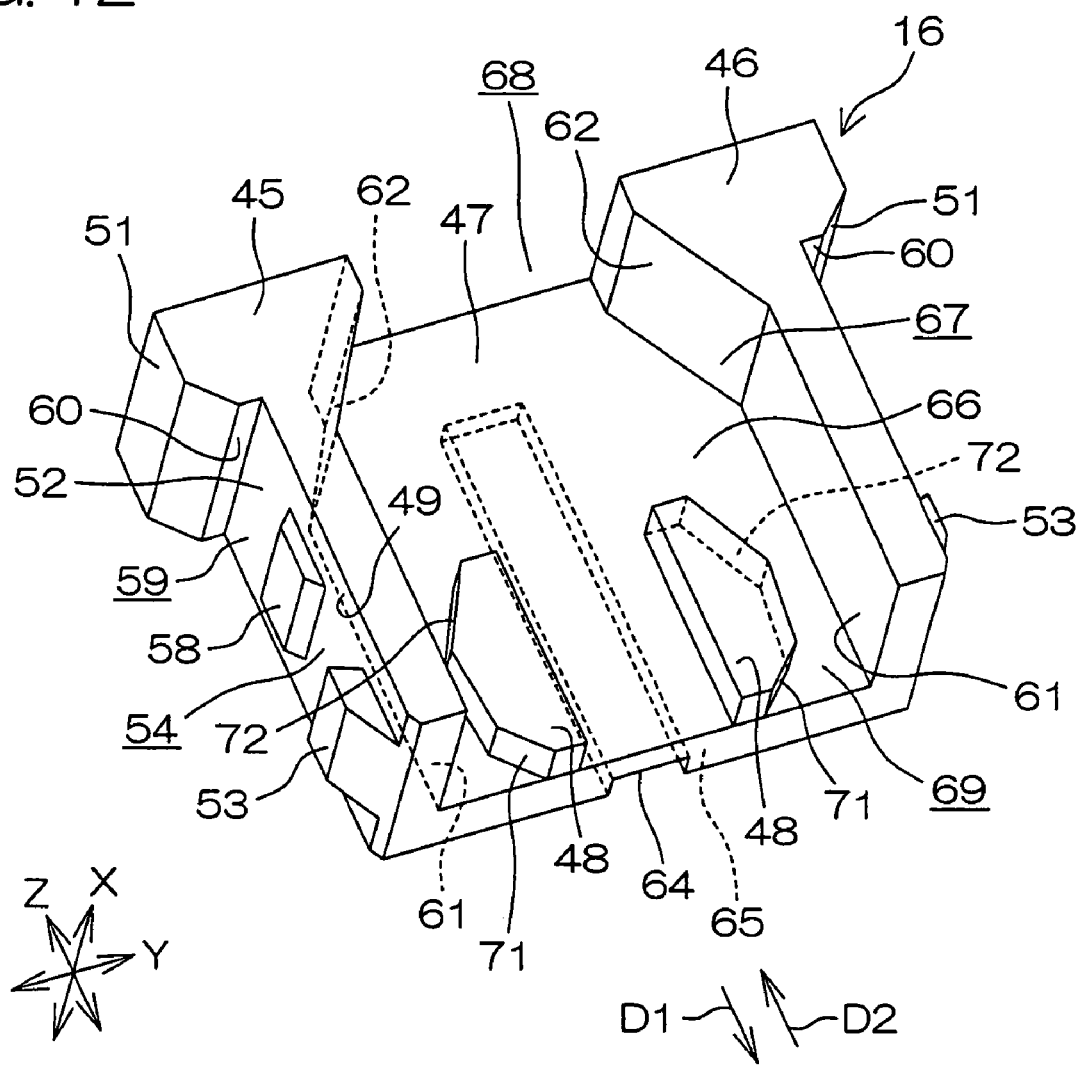
FIG. 12 is a perspective view of an operating member.

FIG. 12 is a perspective view of the operating member 16. Referring to FIG. 8 and FIG. 12, the operating member 16 is a resin molded item formed symmetrically with respect to the direction Y. A section orthogonal to the direction Z of the operating member 16 is in a groove shape.

The operating member 16 has a pair of portions 45 and 46 facing each other at a distance in the direction Y, a joint 47 that joins the pair of portions 45 and 46, and a pair of widening operating portions 48 provided on the joint 47.

The pair of portions 45 and 46 are disposed on both sides across the pair of elastic pieces 30 and 31 in the insertion recess 20. One portion 45 is disposed between one elastic piece 30 and the other second side portion 24b of the peripheral wall 21. The other portion 46 is disposed between the other elastic piece 31 and one second side portion 24a of the peripheral wall 21. The pair of portions 45 and 46 respectively extend in the direction Z.

The tip ends on the second direction D2 side of outer side surfaces 49 of the pair of portions 45 and 46 (only one outer side surface 49 is shown in FIG. 8 and FIG. 12) project outward of the direction Y with respect to a peripheral edge 50 of the opening of the insertion recess 20, and these projecting portions serve as knobs 51. An operator can operate the operating member 16 in the first and second directions D1 and D2 by pinching the knobs 51.

In the pair of outer side surfaces 49, portions where the knobs 51 are not provided are formed into clamp portions 52 extending in the direction Z. On the respective clamp portions 52, first convex portions 53 are provided. The pair of first convex portions 53 are for preventing the operating member 16 from improperly coming off from the insertion recess 20, and are disposed on the tip ends in the first direction D1 of the respective clamp portions 52.

The first convex portions 53 are fitted in corresponding through holes 27 of the peripheral wall 21, and they are received by the peripheral edges of the corresponding through holes 27 to prevent the operating member 16 from coming off from the insertion recess 20.

The tip ends on the first direction D1 side of the first convex portions 53 are formed into inclined shapes. Thereby, when the operating member 16 is fitted in the insertion recess 20, these inclined portions allow insertion of the first convex portions 53 into the corresponding through holes 27 while smoothly engaging with the peripheral edge 50 of the opening of the peripheral wall 21.

Referring to FIG. 8 and FIG. 9, the connector 6 is provided with first and second holding mechanisms 55 and 56.

The first holding mechanism 55 holds the operating member 16 at a widening position shown in FIG. 8. Referring to FIG. 8 and FIG. 12, the first holding mechanism 55 includes first concave portions 54 provided on the respective clamp portions 52 of the operating member 16, and engaging portions 57 that are respectively provided on the pair of second side portions 24 of the peripheral wall 21 and engage with corresponding first concave portions 54.

The first concave portion 54 is demarcated between the first convex portion 53 and the second convex portion 58. The second convex portions 58 are provided on the respective clamp portions 52 and arranged side by side with corresponding first convex portions 53 along the second direction D2. The engaging portions 57 include the portions disposed on the second direction D2 side of the through holes 27 on the pair of second side portions 24 of the peripheral wall 21, respectively, and are fitted in the first concave portions 54 when the operating member 16 is at the widening position shown in FIG. 8.

Referring to FIG. 9 and FIG. 12, the second holding mechanism 56 holds the operating member 16 at a widening released position shown in FIG. 9 and FIG. 11. The second holding mechanism 56 includes second concave portions 59 provided on the respective clamp portions 52 of the operating member 16 and the engaging portions 57 that are provided on the pair of second side portions 24 of the peripheral wall 21, respectively, and engage with corresponding second concave portions 59. That is, the engaging portions 57 form apart of the first holding mechanism 55 and a part of the second holding mechanism 56.

The second concave portions 59 are demarcated between the second convex portions 58 and stepped portions 60 of the respective knobs 51 facing the peripheral wall 21 side. The engaging portions 57 are fitted in the second concave portions 59 when the operating member 16 is at the widening released position shown in FIG. 9.

Inner side surfaces 61 of the pair of portions 45 and 46 face each other at a predetermined distance in the direction Y and sandwich the pair of elastic pieces 30 and 31 of the contact 15. The tip ends in the second direction D2 of these inner side surfaces 61 of the pair of portions 45 and 46 are formed into inclined cam surfaces, and the distance therebetween narrows toward the second direction D2.

By the inclined cam surfaces, pressurizing portions 62 are formed. The pair of pressurizing portions 62 can pressurize pressurized portions 63 provided on the tip end portions 36b of corresponding first pieces 36 of the pair of elastic pieces 30 and 31. When the operating member 16 is at the widening released position shown in FIG. 9, the pair of pressurizing portions 62 come into contact with and pressurize the corresponding pressurized portions 63, thereby the distance between the pair of clamp portions 40 is narrowed, and as a result, the force for clipping the outer lead 10 by these clamp portions 40 can be increased. In addition, lowering in the clipping force due to settling of the pair of elastic pieces 30 and 31 can be prevented.

The pair of pressurizing portions 62 come into contact with and pressurize corresponding pressurized portions 63 when the operating member 16 shifts from the widening position shown in FIG. 8 to the widening released position shown in FIG. 9 along the first direction D1. Thereby, the forces for pressurizing the corresponding pressurized portions 63 in the first direction D1 are converted into forces in the direction Y orthogonal to the first direction D1. Thereby, the pair of elastic pieces 30 and 31 come close to each other.

The joint 47 is formed into a plate shape, and joins respective one-side ends of the pair of portions 45 and 46 in the direction X. On the outer side surface 65 of the joint 47, a groove 64 extending in the direction Z is formed, and is fitted in the guide portion 26 of the other first side portion 23b of the peripheral wall 21 as shown in FIG. 7.

Referring to FIG. 4 and FIG. 12, in the operating member 16, an external form of a section of a portion where the knob 51 is not provided cut along a direction orthogonal to the direction Z is substantially coincident with the shape of the peripheral edge 50 of the opening of the insertion recess 20 observed from the first direction D1. Thereby, the insertion recess 20 is used as a guide groove for guiding the operating member 16 to the widening position and the widening released position along the first and second directions D1 and D2.

Referring to FIG. 8 and FIG. 12, by the inner side surface 66 of the joint 47 and the inner side surfaces 61 of the pair of portions 45 and 46, a space 67 (space between the pair of portions 45 and 46) in which the pair of elastic pieces 30 and 31 can be accommodated is demarcated.

In this space 67, the tip end in the first direction D1 and the tip end in the second direction D2 are open to the outside, and these open points are formed into a pair of open portions 68 and 69. Due to the open portion 68, the space 67 is open to the second direction D2, and this enables the space 67 to be observed from the outside. In addition, a corresponding outer lead 10 can be inserted into the space 67 through the open portion 68.

The pair of widening operating portions 48 are formed by small pieces provided on the inner side surface 66 of the joint 47. The pair of widening operating portions 48 perform the function to widen the distance between the clamp portions 40 of the pair of second pieces 37 via the pair of first pieces 36 by engaging with corresponding engaging portions 42 of the pair of elastic members 30 and 31. The pair of widening operating portions 48 are arranged parallel in the direction X, and are sandwiched between the pair of engaging portions 42.

Each of the pair of widening operating portions 48 has a first inclined cam surface 71 provided on the tip end in the first direction D1 and a second inclined cam surface 72 provided on the tip end in the second direction D2.

The pair of first inclined cam surfaces 71 perform a function to widen the distance between the pair of engaging portions 42 when the operating member 16 is fitted in the insertion recess 20 along the first direction D1. The distance between the pair of inclined cam surfaces 71 narrows toward the first direction D1.

The pair of first inclined cam surfaces 71 come into contact with corresponding engaging portions 42 when the operating member 16 shifts toward the first direction D1. Thereby, the forces of the operating member 16 to press the engaging portions 42 toward the first direction D1 is converted into forces in the direction Y orthogonal to the first direction D1 (forces to widen the distance between the pair of engaging portions 42).

The pair of second inclined cam surfaces 72 come into contact with corresponding engaging portions 42 when the operating member 16 moves along the second direction D2 and shifts from the widening released position to the widening position, thereby performing the function to widen the distance between the pair of engaging portions 42. The distance between the pair of inclined cam surfaces 72 narrows toward the second direction D2.

The pair of second inclined cam surfaces 72 come into contact with the corresponding engaging portions 42 when the operating member 16 shifts to the widening position. Thereby, the forces of the operating member 16 to press the engaging portions 42 toward the second direction D2 are converted into forces in the direction Y orthogonal to the second direction D2 (forces to widen the distance between the pair of engaging portions 42).

Referring to FIG. 11, each widening operating portion 48 includes a first restricting portion 73. Each first restricting portion 73 is for restricting the first piece 36 of a corresponding elastic piece 30 or 31 from shifting in the direction X (longitudinal direction L of the cold cathode fluorescent tube 5: direction along the axial direction of the outer lead 10) when the operating member 16 is at the widening released position.

When the operating member 16 is at the widening released position shown in FIG. 11, each first restricting portion 73 faces the base end portion 36a of a corresponding first piece 36 and restricts this corresponding first piece 36 from moving to one side (deep side of the sheet surface of FIG. 11) of the direction X.

In addition, each widening operating portion 48 includes a second restricting portion 74. Each second restricting portion 74 is for restricting the second piece 37 of a corresponding elastic member 30 or 31 from shifting in the direction X (direction along the axial direction of the outer lead 10) when the operating member 16 is at the widening released position.

When the operating member 16 is at the widening released position, each second restricting portion 74 faces a tip end portion 430 of the corresponding second piece 37, and restricts this corresponding second piece 37 from moving to one side (deep side of the sheet surface of FIG. 11) of the direction X.

Referring to FIG. 8, one first side portion 23a of the peripheral wall 21 includes a third restricting portion 75. The third restricting portion 75 is for restricting the respective first pieces 36 of the pair of elastic pieces 30 and 31 from shifting in the direction X (direction along the axial direction of the outer lead 10). The third restricting portion 75 faces the respective first pieces 36 each other, and restricts the first pieces 36 from moving to the other side of the direction X.

Referring to FIG. 10 and FIG. 11, the widening position of the operating member 16 is a position for widening the distance between the pair of clamp portions 40 by the widening operating portions 48 so that the outer lead 10 can be inserted between the pair of clamp portions 40 with no insertion force. The widening released position is a position for releasing this widening.

Referring to FIG. 10, in the liquid crystal display device having the above-described general construction, the cold cathode fluorescent tube 5 (outer lead 10) is mounted as follows; first, the operating member 16 is held at the widening position shown in FIG. 10. The pair of widening operating portions 48 of the operating member 16 engages with the engaging portion 42 of the corresponding elastic members 30 and 31, and the distance between the pair of second pieces 37 is widened. At this time, the distance between the pair of clamp portions 40 is made wider than the diameter of the outer lead 10, and the distance between the pair of first narrowing portions 39 is made wider than the diameter of the outer lead 10.

In this state, as shown in FIG. 2 and FIG. 10, the corresponding cold cathode fluorescent tube 5 is grasped by hand (not shown), etc., and the outer lead 10 of the cold cathode fluorescent tube 5 is made to face the operating member 16 in the direction Z. Then, the cold cathode fluorescent tube 5 is moved toward the first direction D1 as the attaching direction and the middle portion of the cold cathode fluorescent tube 5 is fitted in the holder 13 of the clamping member 11. Thereby, the middle portion of the cold cathode fluorescent tube 5 is held by the clamping member 11, and the corresponding outer lead 10 of the cold cathode fluorescent tube 5 is moved into the insertion recess 20 as shown by the outline arrow and disposed between the pair of clamp portions 40.

Next, the operating member 16 is moved toward the first direction D1 and shifted from the widening position shown in FIG. 10 to the widening released position shown in FIG. 11. Thereby, engagement of the pair of engaging portions 42 by the pair of widening operating portions 48 is released, and as a result, by the elastic forces of the pair of elastic pieces 30 and 31, the pair of clamp portions 40 clip the corresponding outer lead 10 by the contact portions 44. Thereby, electrical connection between the contact 15 and the corresponding outer lead 10 is achieved. The distance between the pair of first and second narrowing portions 39 and 41 becomes narrower than the diameter of the corresponding outer lead 10.

In addition, by shifting the operating member 16 to the widening released position, the pair of pressurizing portions 62 pressurize the corresponding pressurized portions 63 as shown by the arrow F1. Thereby, these pressurized portions 63 are moved in the direction Y so as to come close to each other. Thereby, the distance between the pair of first pieces 36 is narrowed, and as a result, pressurizing forces act on the pair of second pieces 37 so as to narrow the distance between the clamp portions 40. Thereby, the force for clipping the corresponding outer lead 10 by the pair of clamp portions 40 is increased.

Furthermore, when the operating member 16 shifts to the widening released position, the base end portions 36a of the pair of first pieces 36 press the tip end portions 430 of the corresponding second pieces 37 as shown by the arrow F2. Thereby, these tip ends 430 are moved in the direction Y so as to come close to each other. Thereby, the distance between the pair of tip end portions 430 is narrowed, and as a result, pressurizing forces act to narrow the distance between the pair of clamp portions 40. Thereby, the force for clipping the outer lead 10 by the pair of clamp portions 40 is further increased.

On the other hand, in order to remove the outer lead 10 from the contact 15, the operating member 16 is first shifted from the widening released position to the widening position along the second direction D2 as shown in FIG. 10. When the operating member 16 is shifted to the widening position, the second inclined cam surfaces 72 of the pair of widening operating portions 48 engage with corresponding engaging portions 42 and widen the distance between the pair of engaging portions 42, and accordingly, the distance between the pair of clamp portions 40 is widened. The electrical connection between the pair of clamp portions 40 and the corresponding outer lead 10 is released.

Next, as shown in FIG. 2 and FIG. 10, the cold cathode fluorescent tube 5 is removed from the holder 13 of the clamping member 11 by grasping the cold cathode fluorescent tube 5 by hand, etc., and moved toward the second direction D2. Thereby, the corresponding outer lead 10 of the cold cathode fluorescent tube 5 passes between the pair of first narrowing portions 39 and between the pair of guide portions 43 from the pair of clamp portions 40, and is then extracted from the insertion recess 20.

As described above, according to this embodiment, the clamp portions 40 of the pair of elastic pieces 30 and 31 come into contact with the corresponding outer lead 10 with a predetermined contact pressure by elastically clipping the outer lead 10. Thereby, electrical connection between the contact 15 and the outer lead 10 can be reliably performed.

Furthermore, by widening the distance between the pair of clamp portions 40 by the pair of widening operating portions 48, the corresponding outer lead 10 can be readily inserted between the pair of the clamp portions 40 with a little force, and as a result, electrical connection between the connector 6 and the outer lead 10 can be readily performed.

Furthermore, in order to connect the connectors 6 to the respective pair of outer leads 10 of the cold cathode fluorescent tube 5 and attach the connectors 6 to the circuit board 4, the pair of connectors 6 are singly attached to the circuit board 4. Thereafter, the pair of outer leads 10 of the cold cathode fluorescent tube 5 are inserted into the insertion recesses 20 of corresponding connectors 6 along the first direction D1 so that the pair of outer leads 10 can be clipped between the corresponding pairs of clamp portions 40. That is, the connectors 6 are singly attached to the circuit board 4, and thereafter, the connectors 6 can be connected to the outer leads 10.

The contact 15 and the corresponding outer lead 10 can be connected by a simple operation of moving the operating member 16 toward the first direction D1 to shift from the widening position to the widening released position, so that the connecting operation between the contact 15 and the corresponding outer lead 10 can be automated by using machinery.

In addition, by widening the distance between the pair of clamp portions 40 by shifting the operating member 16 to the widening position, the corresponding outer lead 10 can be readily inserted between these clamp portions 40 with no insertion force. In addition, by releasing the widening by the pair of widening operating portions 48 by shifting the operating member 16 to the widening released position after inserting the outer lead 10, the outer lead 10 can be reliably clipped by the elastic forces of the pair of elastic pieces 30 and 31, thereby further reliable electrical connection to the outer lead 10 can be realized.

Furthermore, by folding-back the second pieces 37 of the pair of elastic pieces 30 and 31 from the tip ends 36b of the corresponding first pieces 36 so as to extend along the first direction D1, the flexibility of the second pieces 37 can be increased, and when the outer lead 10 is inserted between the clamp portions 40, an excessive reactive force can be prevented from acting on the outer lead 10.

Furthermore, by engaging the pair of widening operating portions 48 with the engaging portions 42 provided on the first pieces 36 of corresponding elastic pieces 30 and 31, the distance between the clamp portions 40 of the second pieces 37 is widened via the first pieces 36. Thereby, the pair of elastic pieces 30 and 31 are elastically deformed and the distance between the clamp portions 40 can be widened. In comparison with the case of widening the distance between the clamp portions 40 by elastically deforming only one of the pair of elastic pieces 30 and 31, the elastic deformation amount (load) on the elastic piece to be elastically deformed can be reduced. In addition, the second pieces 37 are not elastically deformed to widen the distance between the clamp portions 40, so that settling of the second pieces 37 can be prevented.

Furthermore, on the respective pair of widening operating portions 48, inclined cam surfaces 72 that come into contact with corresponding engaging portions 42 are formed. The second inclined cam surfaces 72 come into contact with the corresponding engaging portions 42 when the operating member 16 shifts to the widening position. Thereby, the force to press the engaging portions 42 toward the second direction D2 is converted into forces in the direction Y. Thereby, the force to move the operating member 16 toward the second direction D2 can be converted into forces to widen the distance between the pair of clamp portions 40. When the operating member 16 is moved, the distance between the pair of clamp portions 40 can be reliably widened.

In addition, by providing the first restricting portions 73 on the pair of widening operating portions 48, respectively, the pair of first pieces 36 can be prevented from improperly moving to one side of the direction X and being applied with an excessive load. Furthermore, by providing the third restricting portion 75 on the peripheral wall 21, the pair of first pieces 36 can be prevented from improperly moving to the other side of the direction X and being applied with an excessive load.

Furthermore, by providing second restricting portions 74 on the pair of widening operating portions 48, respectively, the pair of second pieces 37 can be prevented from improperly moving to one side of the direction X and being applied with an excessive load. Furthermore, it can be prevented that these second pieces 37 improperly move to one side of the direction X and the positions of the outer lead 10 and the corresponding clamp portions 40 deviate from each other.

By providing the pair of pressurizing portions 62 on the operating member 16, the forces of the pair of clamp portions 40 to clip the outer lead 10 can be increased, and as a result, further reliable contact between the clamp portions 40 and the outer lead 10 can be realized.

Furthermore, by pressurizing the pressurized portions 63 provided on the first pieces 36 corresponding to the respective pressurizing portions 62, the forces from the respective pressurizing portions 62 are reliably transmitted to the corresponding pair of elastic pieces 30 and 31. In addition, by transmitting the pressurizing forces from the respective pressurizing portions 62 to the second pieces 37 via the corresponding first pieces 36, an excessive pressurizing force can be prevented from acting on the second pieces 37 (the outer lead 10).

By providing the pressurizing portions 62 on the pair of portions 45 and 46 of the operating member 16, respectively, the pair of elastic pieces 30 and 31 can be clipped by the pair of pressurizing portions 62, and as a result, the pressurizing forces can be reliably supplied to these elastic pieces 30 and 31.

Furthermore, the pair of pressurizing portions 62 are formed into inclined cam surfaces, respectively. These inclined cam surfaces come into contact with the corresponding pressurized portions 63 when the operating member 16 shifts to the widening released position, and thereby, the forces of the respective pressurizing portions 62 to pressurize the pressurized portions 63 toward the first direction D1 are converted into forces in the direction Y. Thereby, the force to move the operating member 16 to the widening released position C2 can be converted into forces to narrow the distance between the pair of clamp portions 40. When the operating member 16 is moved, the distance between the pair of clamp portions 40 can be reliably narrowed.

In addition, the outer lead 10 that is extremely small in diameter and readily deformed can be readily inserted between the pair of clamp portions 40 with a little force, and as a result, an excessive force can be prevented from acting on the outer lead 10. The outer lead 10 can be prevented from being damaged.

Furthermore, the operating member 16 is held by the housing 14 in a shiftable manner between the widening position and the widening released position. While the operating member 16 is held by the housing 14, the operating member 16 can be shifted to the widening position and the widening released position.

The insertion recess 20 is used as a guide groove. By a simple operation of moving the operating member 16 along the insertion recess 20, the operating member 16 can be reliably shifted to the widening position and the widening released position.

Furthermore, the open portion 68 is formed in the operating member 16. Therefore, the space 67 between the pair of portions 45 and 46 can be viewed through the open portion 68. Thereby, it can be readily confirmed whether the respective clamp portions 40 are in contact with the corresponding outer lead 10 and whether the pair of pressurizing portions 62 are pressurizing the pair of pressurized portions 63.

By the first holding mechanism 55, the operating member 16 can be reliably held at the widening position.

Furthermore, by the second holding mechanism 56, the operating member 16 can be reliably held at the widening released position.

In addition, by disposing the cold cathode fluorescent tubes 5 on the first surface 4a of the circuit board 4 and disposing the inverter circuit 7 on the second surface 4b of the circuit board 4, these members can be stacked in the thickness direction of the circuit board 4. Thereby, the area occupied by the circuit board 4 in the plane direction can be reduced and space-saving thereof can be achieved. By disposing the circuit board 4 between the cold cathode fluorescent tube 5 and the inverter circuit 7, the circuit board 4 can be used as an insulating layer between the cold cathode fluorescent tube 5 and the inverter circuit 7.

The present invention is not limited to the contents described in the embodiment given above.

Figure 13:
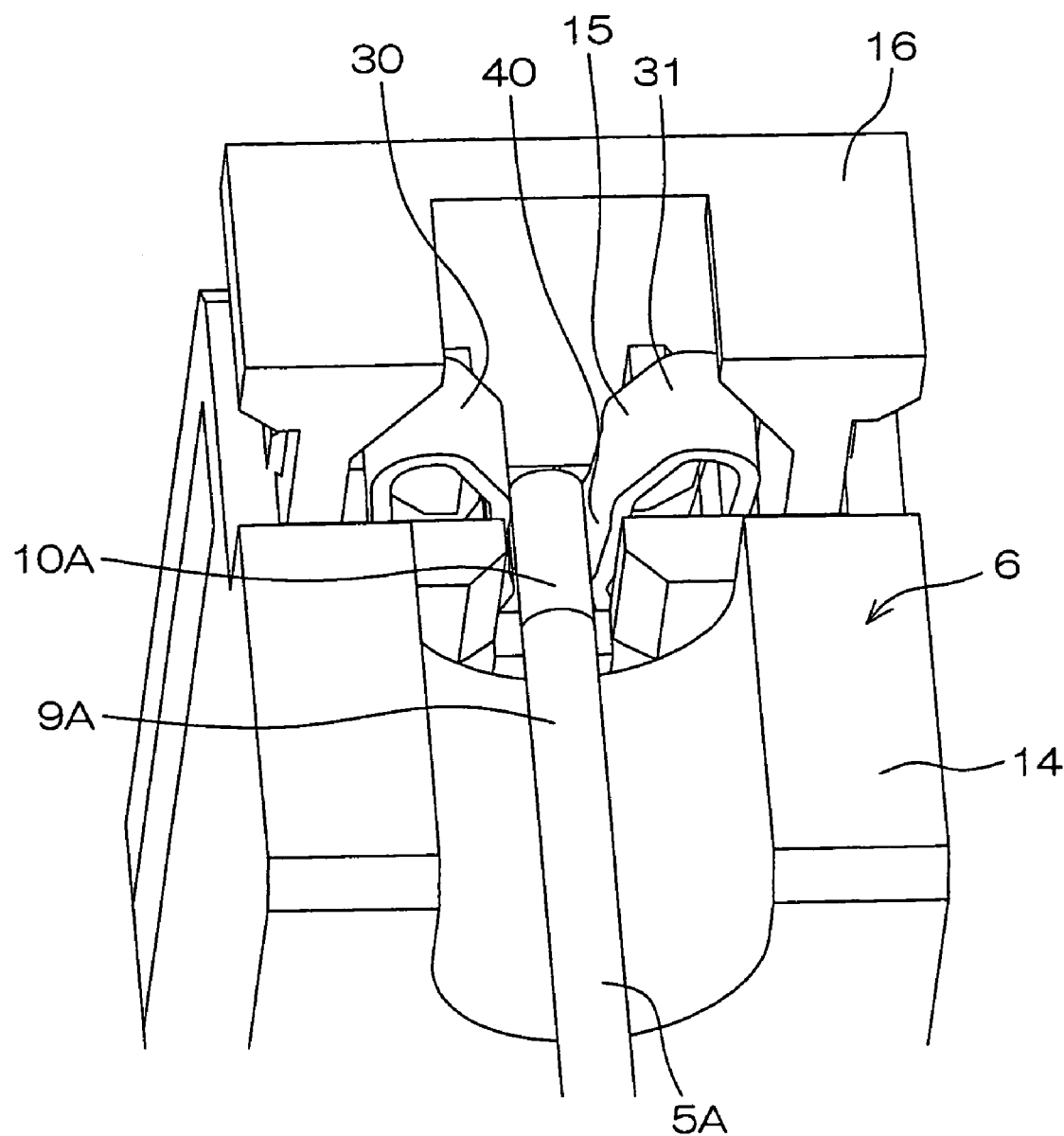
FIG. 13 is a perspective view of a main part of another embodiment of the present invention.

For example, an external electrode fluorescent tube 5A can be used instead of the cold cathode fluorescent tube 5 as shown in FIG. 13. In this case, an electrode layer 10A as a terminal is covered on the respective peripheral surfaces of a pair of end portions 9A (only one end portion 9A is shown in FIG. 13) of the external electrode fluorescent tube 5A.

In this case, the electrode layer 10A can be readily inserted between the pair of clamp portions 40 with a little force, and an excessive force can be prevented from acting on the electrode layer 10A. The electrode layer 10A can be prevented from rubbing against and being damaged by the pair of elastic pieces 30 and 31.

The tip end portions 430 of the respective second pieces 37 can be omitted. Furthermore, it is also possible that inclined cam surfaces similar to the first and second inclined cam surfaces 71 and 72 of the widening operating portions 48 can be provided on the engaging portions 42. In this case, on the widening operating portions 48, surfaces straight in the direction Z can be provided instead of the first and second inclined cam surfaces 71 and 72.

The pair of pressurizing portions 62 and the corresponding pair of pressurized portions 63 can be omitted. Furthermore, the pair of first narrowing portions 39 can be omitted, the pair of second narrowing portions 41 can be omitted, and the pair of guide portions 43 can be omitted. Either one of the pair of widening operating portions 48 can be omitted. Furthermore, inclined cam surfaces similar to the pressurizing portions 62 can be provided on the pressurized portions 63. In this case, the pressurizing portions 62 can be formed into surfaces straight in the direction Z.

Figure 14:
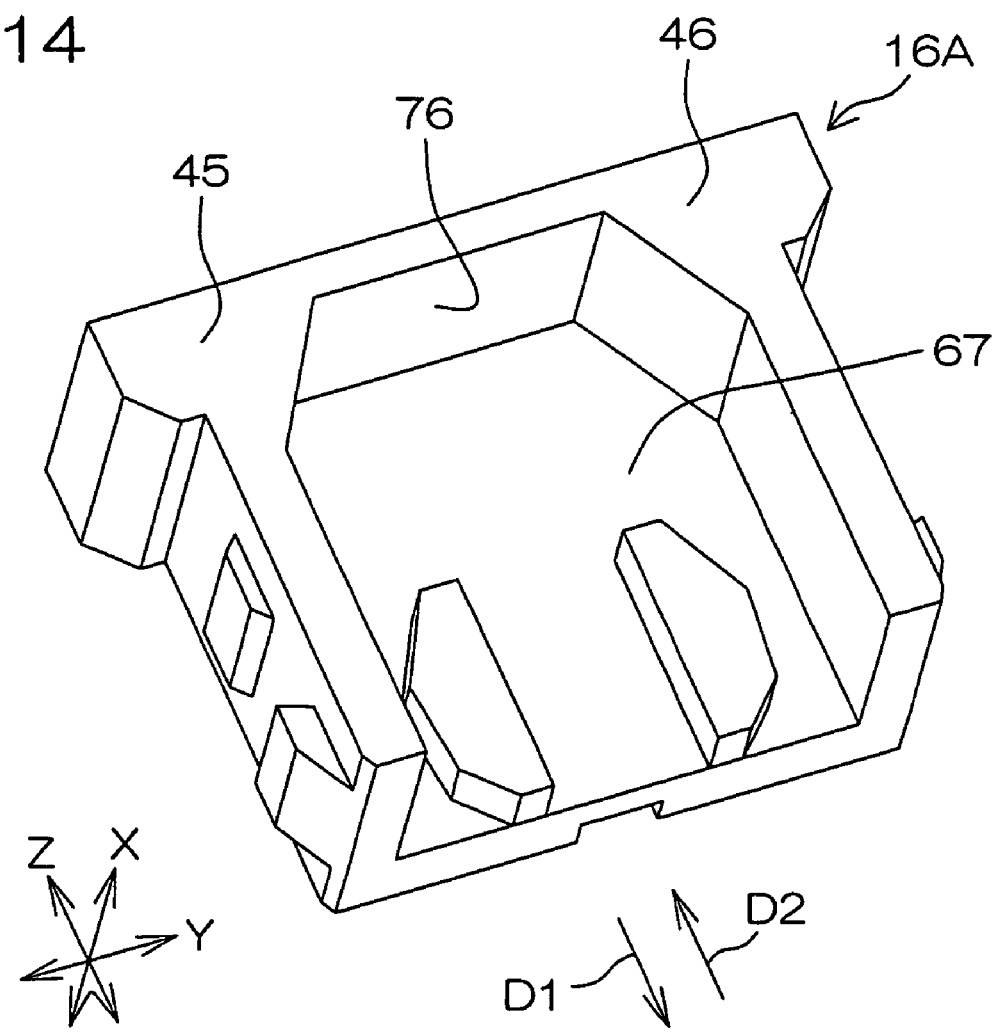
FIG. 14 is a perspective view of a main part of still another embodiment of the present invention.

In addition, instead of the operating member 16, the operating member 16A shown in FIG. 14 can be used. The operating member 16A has an opening preventive portion 76 that prevents the space 67 between the pair of portions 45 and 46 from opening to the second direction D2.

The opening preventive portion 76 is integrally formed with the pair of portions 45 and 46 by using a single member. This opening preventive portion 76 connects the tip end portions in the second direction D2 of the pair of portions 45 and 46 to each other. By providing the opening preventive portion 76, intrusion of a foreign matter in the space 67 between the pair of portions 45 and 46 can be prevented.

By forming the section of the opening preventive portion 76 from a transparent material, the space between the pair of portions 45 and 46 can be observed from the outside. It is also possible that the opening preventive portion 76 is separately formed from the pair of portions 45 and 46 and is joined thereto via a hinge mechanism. In this case, the space between the pair of portions 45 and 46 can be observed by opening the opening preventive portion 76.

Figure 15:
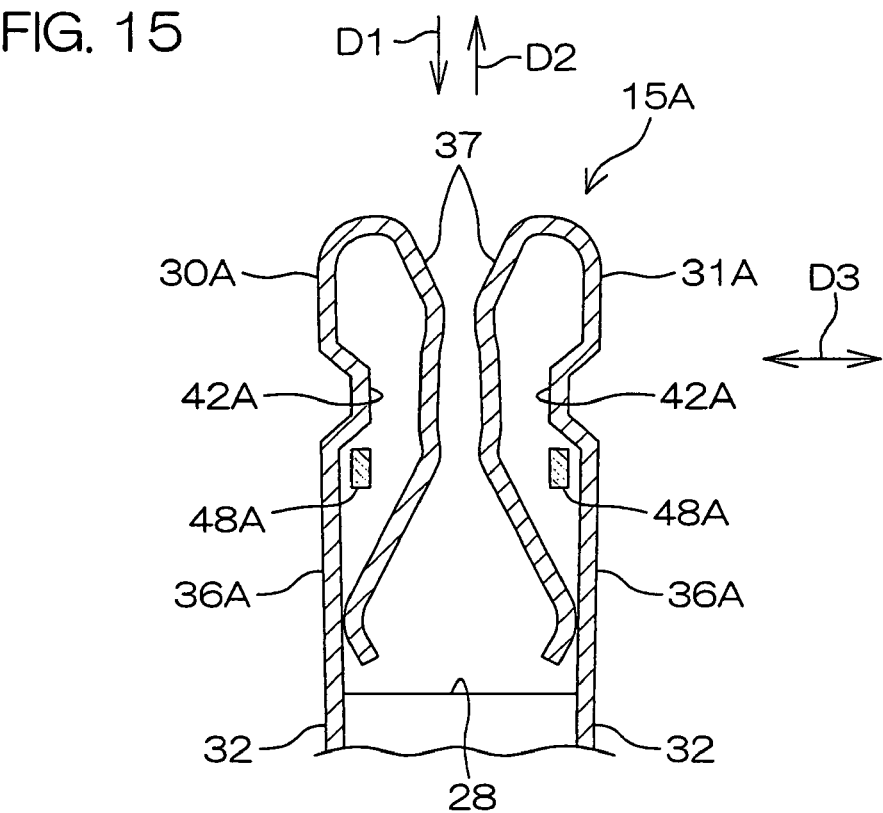
FIG. 15 is a sectional view of a main part of still another embodiment of the present invention.

Furthermore, the contact 15A shown in FIG. 15 can be used instead of the contact 15. On each of the pair of elastic pieces 30A and 31A, the first piece 36A itself is provided with an engaging portion 42A. In this case, parts of middle portions of the pair of first pieces 36A swell in directions to approach each other, and these swelling portions serve as the engaging portions 42A. The widening operating portions 48A are disposed on the inner sides of the corresponding elastic pieces 30A and 31A.

Figure 16:
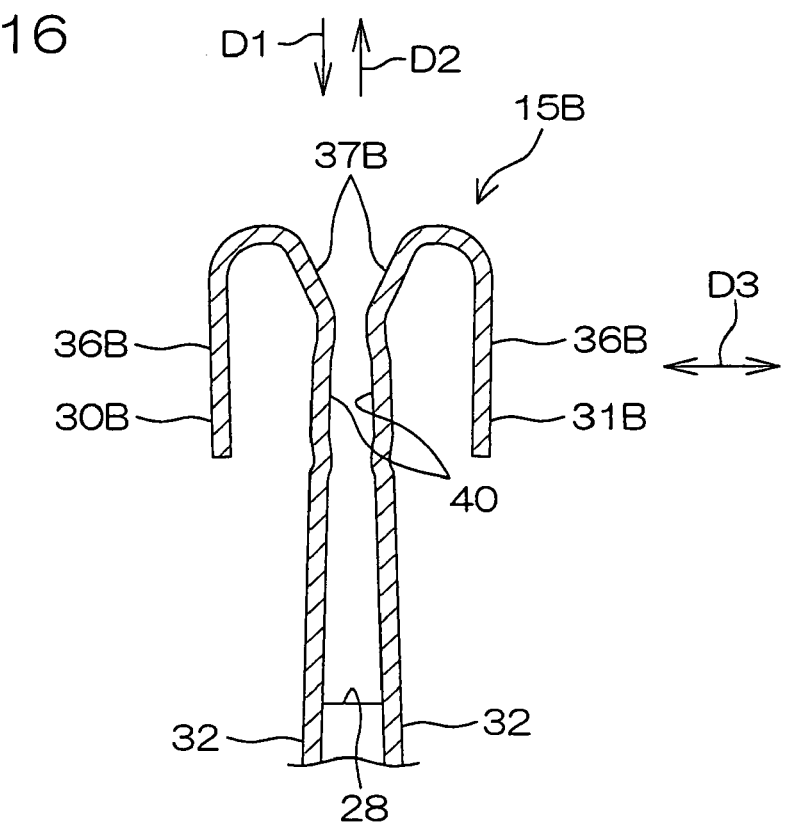
FIG. 16 is a sectional view of a main part of still another embodiment of the present invention.

The contact 15B shown in FIG. 16 can be used instead of the contact 15. Each of the pair of elastic pieces 30B and 31B includes a second piece 37B extending along the second direction D2, and a first piece 36B that is folded back from the tip end in the second direction D2 of the second piece 37B and extends along the first direction D1. A pair of second pieces 37B are disposed relatively close to each other, and a pair of first pieces 36B are disposed relatively distant from each other. On the respective second pieces 37B, clamp portions 40 are disposed.

Furthermore, the first restricting portion 73 can be omitted, the second restricting portion 74 can be omitted, and the third restricting portion 75 can be omitted. The number of clamping members 11 to be provided for one cold cathode fluorescent tube 5 can be two or more. Furthermore, the connector 6 can be applied to an edge light type liquid crystal display device.

It is also possible that the connector of the present invention is used for connection to a shaft-like terminal of others except for the fluorescent tube. For example, it can be used for connection to a terminal of a multipole cable including a number of twisted wires. In the case of the multipole cable, the diameter of the terminal becomes thick, so that a sufficient contact pressure with the contact must be secured. Therefore, the effect of using the connector of the present invention which can secure a sufficient contact pressure and can be attached to the contact with no insertion force is significant.

The present invention is described in detail above based on a detailed embodiment, and those skilled in the art who understand the details of the description given above will readily conceive alterations, modifications, and equivalents thereof. Therefore, the scope of the present invention should be within the range of the claims and the equivalents thereof.

The present application corresponds to Japanese Patent Application No. 2005-234794 submitted to the Japanese Patent Office on Aug. 12, 2005, and the entire disclosure of this application is incorporated herein by reference.

The invention claimed is:

1. A method for attaching a fluorescent tube, comprising the steps of:
    inserting a terminal at an end portion of the fluorescent tube with no insertion force between clamp portions opposed to each other of a pair of elastic pieces of a contact along an attaching direction;
    clamping the terminal, which is inserted between the clamp portions, elastically between the clamp portions, wherein in the clamping step, the terminal is elastically clamped between the clamp portions of the pair of elastic pieces in response to an operation for shifting an operating member for operating the contact in a direction which is parallel to the attaching direction and faces the same direction as the attaching direction; and
    widening a distance between the clamp portions of the pair of elastic pieces before the inserting step.

2. A method for attaching a fluorescent tube according to claim 1,
wherein in the clamping step, the terminal is elastically clamped between straight portions as the clamp portions of the pair of elastic pieces.

3. A method for attaching a fluorescent tube according to claim 1,
wherein in the widening step, the distance between the clamp portions of the pair of elastic pieces is forcedly widened.

4. A method for attaching a fluorescent tube according to claim 1,
wherein in the widening step, the distance between the clamp portions of the pair of elastic pieces is forcedly widened in response to an operation for shifting a widening operating portion of the operating member for operating the contact.

* * * * *